(12) United States Patent
Lindqvist et al.

(10) Patent No.: US 8,065,100 B2
(45) Date of Patent: Nov. 22, 2011

(54) METHOD AND A SYSTEM FOR CABLE OR SUBSCRIBER LOOP INVESTIGATION PERFORMING LOOP TOPOLOGY IDENTIFICATION

(75) Inventors: Fredrik Lindqvist, Älvsjö (SE); Antoni Fertner, Stockholm (SE); Per Ola Börjesson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 633 days.

(21) Appl. No.: 12/162,665

(22) PCT Filed: Jan. 31, 2006

(86) PCT No.: PCT/SE2006/000134
§ 371 (c)(1),
(2), (4) Date: Jul. 30, 2008

(87) PCT Pub. No.: WO2007/089173
PCT Pub. Date: Aug. 9, 2007

(65) Prior Publication Data
US 2009/0024340 A1 Jan. 22, 2009

(51) Int. Cl.
*G01R 11/16* (2006.01)
*G01R 5/28* (2006.01)
*G01R 29/08* (2006.01)
*G01N 35/00* (2006.01)

(52) U.S. Cl. .................. 702/65; 702/57; 702/69; 702/81

(58) Field of Classification Search .................... 702/65, 702/66, 79, 106, 108, 189; 375/222; 379/22.01
See application file for complete search history.

(56) References Cited

U.S. PATENT DOCUMENTS

| 6,404,806 | B1 * | 6/2002 | Ginesi et al. | 375/222 |
| 6,724,859 | B1 | 4/2004 | Galli | |
| 7,263,121 | B2 * | 8/2007 | Belge et al. | 375/222 |
| 7,426,262 | B2 * | 9/2008 | Rosenberg | 379/22.01 |
| 7,688,884 | B2 * | 3/2010 | Cioffi et al. | 375/222 |
| 2005/0069028 | A1 | 3/2005 | Belge et al. | |

* cited by examiner

*Primary Examiner* — Mohamed Charioui
*Assistant Examiner* — Felix Suarez

(57) ABSTRACT

A system and method for using loop topology identification to investigate a transmission line having a plurality of cable segments. At a measurement plane for each segment, a probing signal is transmitted into the cable. A reflected signal is detected, and an equivalent total input impedance is calculated. The system iteratively calculates the distance between the measurement planes as well as the length, characteristic impedance, and the propagation constant of each segment. A model is used to calculate the respective equivalent input impedance of each segment using the calculated characteristic impedance, propagation constant, and length of the preceding segment. The equivalent total input impedance is then calculated from the iteratively calculated segment values.

34 Claims, 7 Drawing Sheets

METHOD AND A SYSTEM FOR CABLE OR SUBSCRIBER LOOP INVESTIGATION PERFORMING LOOP TOPOLOGY IDENTIFICATION

FIELD OF THE INVENTION

The present invention relates to a method for investigation of a transmission line including a number of cable segments, which method comprises performing a loop topology identification. The invention also relates to a system for investigation of a transmission line or a subscriber loop which includes a number of cable segments. The system is adapted to perform a loop topology identification.

STATE OF THE ART

Within telecommunications today it is becoming more and more widespread and attractive to offer xDSL, i.e. high speed DSL access, not only to large companies but also to small companies and home subscribers. However, this means that loops and cables, often copper wires, have to be in a state such as to allow that, which means that advanced loop qualification systems are needed which can detect or minimize qualification errors. Loop qualification actually comprises determination as to whether a loop or a cable is capable of supporting DSL services or not. Estimation of the achievable channel capacity in xDSL transmission using single-ended loop testing (SELT) is important for telephone network operators. The loop introduces frequency dependent attenuation, insertion losses etc. between transmitter and receiver. In addition thereto the attenuation is dependent on the type of cable and on the length of the cable. Sometimes the attenuation is roughly estimated based on cable length estimate and an assumed average attenuation per unit length.

Using SELT, an xDSL modem can report single-ended measurements before activation of DSL services or in order to analyze DSL lines that do not work.

By modelling and estimating the unknown cable characteristics, it is possible to obtain a more accurate estimate. However, in order to be able to model a multi-segment cable, a multi-dimensional optimization is required, which is very difficult without a priori knowledge, for example concerning the number of cable segments and the length of each segment, which normally is not available.

Other important tasks for a telecom network provider is trouble-shooting and network maintenance. For this purpose the Time Domain Reflectometry (TDR) technique, which is based on transmitting a probing signal into the transmission line, a cable, and measuring the reflected TDR signal, is regularly used to measure the transmission line and extract various kinds of information. The measured TDR signal can be improved significantly by removing the Slowly Decaying Tail (SDT) caused by impedance mismatch of the SELT equipment and the RLC-nature of the cable. In fact, even if only the first segment of the multi-segment cable can be accurately estimated, the resulting enhanced TDR signal will be useful for further analysis, such as for bridge-tap detection and localisation.

A major part of the loop plant or the cabling was installed decades ago, and, of course, over the years, the loops have undergone changes, voluntarily as well as involuntarily, which may have been documented, but also often have not been documented. This means that existing documentation might not at all be adequate.

As referred to above, the SELT is a technique to identify from a Central Office (CO) whether a loop qualifies for DSL services or not. SELT is used to determine particular characteristics of the subscriber line such as loop length, attenuation, the presence and location of bridge taps and load coils etc. This information gives the service providers an idea about the line capacity when noise and other interference characteristics are known. Within the SELT area, one approach is based on estimating the length and attenuation of a transmission line. With the TDR technique, as referred to above, a pulse is transmitted on the line and the received reflected echo signal is recorded. The received signal will contain one or several echoes that could come from the far-end side of the line, bridge-taps or cable gauge changes etc.

It is known to integrate the broadband SELT function into an ordinary ADSL transceiver. This may cause problems when implementing the TDR technique, since an ADSL transceiver actually is not designed for SELT. In fact, dedicated SELT instruments have metallic contact to the line in contrary to an ADSL transceiver, which has an analog front-end equipped with a transformer. In order to catch and amplify the weak far-end reflected pulse, a carefully designed filter has to be used. However, as an example, a well-designed filter optimized for a cable length of about 1 km will not perform well for a cable length of 4 km and vice versa. One solution to this problem is to make use of several filters optimized for different cable lengths. However, the applied filters have to have band-pass characteristic which makes the sign of the TDR signal difficult to analyze, which is of significant importance e.g. when detecting bridge-taps and type of far-end termination.

U.S. Pat. No. 6,724,859, U.S. Pat. No. 6,538,451 and US 2004/0230390 all address the problems with Slowly Decaying Tails (SDT) inherited in the TDR signal and describe complete loop topology identification using hypothesis-testing involving searching a large cable database. It also includes estimation of the transfer function. However, since an enormous amount of different kinds of cables exist in the telecommunication networks, the database must be very large. Even more serious is the problem that some of the used cables are entirely unknown to the operators. Furthermore temperature variations and degradations over time make the characteristic of the cables change with time. This makes establishment of whether a cable can be used for DSL or not almost impossible and it also makes maintenance difficult as well as trouble-shooting.

SUMMARY OF THE INVENTION

What is needed is therefore a method as initially referred to which facilitates transmission line or subscriber loop investigation. A method is also needed which facilitates maintenance. Further yet a method is needed which facilitates trouble-shooting in transmission lines or in the subscriber loop. A method is also needed which facilitates introduction of xDSL in that a method is provided for investigation of cables to establish whether they can be used for DSL or not. Particularly a method is needed through which investigation of multi-segment cables is facilitated. Even more particularly a method is needed through which cables can be investigated in a more reliable, faster, easier and cheaper manner, particularly without requiring any particular prior knowledge, for example as to the number of cable segments, lengths of the segments etc.

Even more particularly a method is needed through which old cables for which the documentation is not sufficient, or even none at all, can be investigated. Most particularly a method is needed through which the use of large cable databases can be avoided. Even more particularly a method is needed through which unknown cables, also new cables, can be investigated. A method is also needed through which the SELT technique can be improved as far as measurement features and accuracy are concerned. A method is also needed through which cable investigation can be performed in a fast and reliable way and through which less power and memory consumption than hitherto are required. Particularly a method is needed through which variations in electrical characteristics due to for example temperature variations and degradations over time etc. can be provided. Even more particularly a method is needed which does not require metallic access or by-passing hybrid circuits.

A system through which one or more of the above mentioned objects can be met is also needed.

Therefore a method for investigation of a transmission line including a number of cable segments ($S_1, \ldots, S_N$) by performing of a loop topology identification, is provided which includes the steps of; input of a probing signal by means of a measuring equipment connected at a first measurement plane ($p_1$) into the transmission line; receiving a reflected echo signal comprising the reflected probing signal. According to the invention it comprises the steps of; using said reflected echo signal to calculate the equivalent total input impedance, e.g. $Z_{in}^{(1)}(f)$, $(Z_{in}^{(1)}(f))^2$ or $S_{11}^{(1)}(f)$; transforming the equivalent total input impedance to a plane domain, e.g. the time domain $z_{in}^{(1)}(t)$, $(s_{in}^{(1)}(t))^2$ or $s_{11}^{(1)}(t)$, i.e. to a time equivalent total input impedance, if necessary or desirable or to allow estimation of cable segment lengths, consecutively, for $i=1, \ldots, N$; N being the total, iteratively determined number of cable segments; establishing an estimate of, or information relating to, the length of a cable segment $s_i$, the length of which corresponds to the distance $d^i$ from said measurement plane $p_i$ to the subsequent measurement plane $p_{i+1}$; using a selected cable model expressed as a vector $\bar{\theta}_{i,model}$ comprising a number of unknown parameters; setting up a criteria function $J_i$ related to the selected cable model and for the respective cable segment $s_i$; applying the criteria function $J_i$ on the selected cable model; minimizing the criteria function $J_i$ to provide an estimate of a real cable model vector $\bar{\theta}_i$ by reducing or eliminating the influence of the reflected signal produced at measurement planes $p_i$; calculating the characteristic impedance $Z_o(f,\bar{\theta}_i)$ and the propagation constant $\gamma(f,\bar{\theta}_i)$ using the estimated real model vector $\bar{\theta}_i$ of segment $s_i$; calculating the equivalent input impedance, e.g. $Z_{in}^{(i+1)}(f)$ or $S_{11}^{(i+1)}(f)$, of the respective subsequent cable segments using the calculated characteristic impedance $Z_o(f, \bar{\theta}_i)$, of the preceding cable segment $s_i$, the propagation constant or velocity $\gamma(f,\bar{\theta}_i)$, an estimated length of the preceding cable segment $s_i$ and the equivalent input impedance, e.g. $Z_{in}^{(i)}(f)$ or $S_{11}^{(i)}(f)$ of the respective preceding cable segment $s_i$; transforming the equivalent total input impedance, $Z_{in}^{(i)}(f)$ or $S_{11}^{(i)}(f)$ of the subsequent measurement plane $p_{i+1}$ to time domain such that a loop topology identification is provided iteratively giving information about a number of current transmission line characteristics.

Particularly the measuring equipment is based on Frequency- or Time Domain Reflectometry. In one embodiment the calculated equivalent total input impedance comprises the total input impedance $Z_{in}^{(1)}(f)$. In another embodiment the calculated equivalent total input impedance comprises a scattering signal $S_{11}^{(1)}(f)$. In still another embodiment the calculated equivalent total input impedance comprises the total squared input impedance $(Z_{in}^{(1)}(f))^2$. The scattering signal may particularly comprise a one-port scattering signal $S_{11}^{(1)}(f)$ depending on the total input impedance $Z_{in}^{(1)}(f)$ and a known determined output impedance $Z_{out}(f)$ as: $S_{11}^{(1)}(f)=(Z_{in}^{(1)}(f)-Z_{out}(f))/(Z_{in}^{(1)}(f)+Z_{out}(f))$. The method particularly comprises the step of, before transforming the respective equivalent input impedance; filtering the calculated equivalent input impedance to improve the measurement of the reflected echo signal. In advantageous embodiments the transforming step comprises; transforming the respective equivalent input impedance signal to a real/complex valued signal in the time domain by means of an Inverse Discrete Fourier Transform (IDTF) using a Fast Fourier Transform (IFFT) algorithm, with/without Hermitian symmetry expansion. Preferably the method comprises the step of; using, as a parameterized frequency dependent cable model, a model comprising electrical and/or physical parameters related to the characteristics of the cable per length unit defined in a table for different cable dimensions providing a vector with M unknown parameters, $\bar{\theta}=[x_1, x_2, \ldots x_M]$. The formal cable model may then be one of several possible ETSI models. Most particularly the method comprises; using, as a parameterized frequency dependent cable model, an ETSI model with primary parameters comprising the resistance, inductance, the capacitance and the conductance respectively per length unit defined in a table for different cable dimensions providing a vector with unknown parameters, $\bar{\theta}=[r_{oc}, a_c, L_o, L_\infty, f_m, b, C_{const}]$.

In specific implementations thereof it may comprise the step of; using a Hilbert transform to reduce the number of unknown parameters hence providing a vector $\bar{\theta}$ with a reduced number of unknown parameters, e.g. $\bar{\theta}=[r_{oc}, a_c, L_{c\infty}, C_{const}]$ although it is not necessary for the inventive concept to use a Hilbert transform. The minimizing step particularly comprises; performing an optimization using an optimization algorithm to estimate at least some of the unknown primary parameters and allowing calculation or estimation of the unknown secondary parameters comprising the respective characteristic impedance and the propagation constant or velocity of the respective cable segment. Even more particularly the optimization step comprises, based on a criteria function $J_i$ defined in the time or the frequency domain, for the respective segment $s_i$; transforming the used frequency domain criteria function to time domain; using time indices indicating the time interval corresponding to the respective cable segment $s_i$, $i=1, \ldots, N$; minimizing the respective criteria function $J_i$ in each iterative step, i.e. for each consecutive cable segment $s_i$.

Particularly in any one of the embodiments, the method comprises the step of, for minimizing the criteria function, using the general or an analytical least square approach to provide the unknown parameters. Most particularly it comprises the step of, in each iteration step, or for each cable segment $s_i$; estimating the unknown parameters, e.g. the unknown vector $\bar{\theta}_i$, $i-1, \ldots, N$; storing the unknown parameters, e.g. the respective unknown parameter vector $\bar{\theta}_i$; using the $\bar{\theta}_i$-vectors to build a cable model. Even more particularly it comprises the step of; calculating or virtually measuring the input impedance $Z_{in}^{(i)}$ or the scattering signal $S_{11}^{(i)}$ seen from the beginning of segment $s_i$ based on the previous unknown parameters of the respective previous unknown parameter vectors $\bar{\theta}_{i-1}$. Preferably it also comprises the step of; compensating for a mismatch between the measured total input equivalent impedance and the output impedance of the measurement equipment. The compensating step particularly comprises; subtracting the ratio of the difference between the calculated equivalent total input impedance and the equipment output impedance and the sum of the calculated equivalent total input impedance and the equivalent output impedance from the calculated equivalent total input equivalent impedance.

In advantageous embodiments the measurement equipment implements Single Ended Loop Testing (SELT). According to the invention the method may provide information about a number of characteristics of the cable, such as one or more of the number of cable segments, the length of each cable segment, electrical characteristics for each cable segment, attenuation, cable structure, and far-end termination.

A system for investigation of a transmission line including a number of cable segments $(S_1, \ldots, S_N)$ is therefore also provided. The investigation comprises performing a loop topology identification, and the system comprising a measuring equipment connected at a first measurement plane $p_i$, means for transmitting a probing signal into the cable and means for handling a reflected echo signal from the transmitted probing signal, said reflected echo signal comprising one or more echoes. According to the invention the system comprises calculating means for calculating the equivalent total input impedance, e.g. $Z_{in}^{(1)}(f)$, $(Z_{in}^{(1)}(f))^2$ or $S_{11}^{(1)}(f)$; means for transforming the calculated equivalent total input impedance, e.g. $Z_{in}^{(1)}(f)$, $(Z_{in}^{(1)}(f))^2$ or $S_{11}^{(1)}(f)$, to time domain, if necessary, calculating means adapted to, for $i=, \ldots, N$, establishing an estimate of, or information relating to, the length of the respective cable segment $s_i$ corresponding to the distance $d_i$ from a measurement plane $p_i$ to the subsequent measurement plane $p_{i+1}$, and comprising an algorithm executing means adapted to select or use a model for estimating or calculating the characteristic impedance and the propagation constant or velocity of respective cable segment based on a number of unknown parameters represented as a respective vector $\bar{\theta}_i$ for the respective segment $s_i$ to set up a criteria function $J_i$ associated with said model and for each respective segment $s_i$ apply said criteria function $J_i$ on the model, and to iteratively calculate the respective equivalent input impedance, e.g. $Z_{in}^{(i+1)}(f)$ or $S_{11}^{(i+1)}(f)$, of the respective subsequent cable segments using the calculated characteristic impedance $Z_0(f,\bar{\theta}_i)$ of the preceding cable segment $s_i$, the propagation constant $\gamma(f,\bar{\theta}_i)$ or propagation velocity with an estimated length of the respective preceding cable segment $s_i$ and the equivalent input impedance, e.g. $Z_{in}^{(i)}(f)$, $(Z_{in}^{(i)}(f))^2$ or $S_{11}^{(i)}(f)$ of the preceding cable segment and to transform the total input impedance of the subsequent measurement plane $p_{i+1}$ such that a loop topology identification is provided iteratively. Particularly the measuring equipment implements Time Domain Reflectometry. The calculated equivalent total input impedance comprises the total input impedance $Z_{in}^{(1)}(f)$ or a scattering signal $S_{11}^{(1)}(f)$ or the total squared input impedance $(Z_{in}^{(i)}(f))^2$. Particularly the system comprises filtering means for filtering the calculated equivalent total input impedance to improve the quality of the echo signal. The transforming means in advantageous implementations comprises a Fast Fourier Transform algorithm for application of an Inverse (e.g. Discrete) Fourier Transform to the calculated equivalent total input impedance. Particularly the cable model comprises a number of unknown parameters, represented as a vector $\bar{\theta}_i$ for each respective segment $s_i$ comprising the secondary parameters constituting the characteristic impedance $Z_0(f,\bar{\theta}_i)$, $i=1, \ldots, N$ and the propagation constant $\gamma(f,\bar{\theta}_i)$. Preferably each respective criteria function $J_i$ is iteratively minimized for the respective $s_i$ to reduce or eliminate the influence of the reflected signal produced at the respective measurement plane $p_i$. In the last iteration step the estimated parameters $\bar{\theta}_N$ and calculated equivalent impedance or scattering signal, $Z_{in}^{(N)}(f)$ or $S_{in}^{(N)}(f)$ particularly provides means for calculating the input impedance corresponding to the impedance of the termination end point of the transmission line. It is adapted to use an analytical least square (ALS) algorithm in the successive modelling and estimation, alternatively a general LTI is used. The system may be implemented as software connected to the measuring equipment and optionally a transceiver. Alternatively it is implemented as hardware, e.g. using ASIC or FPGA. Particularly the system and the method according to the invention may be used to build a cable database.

BRIEF DESCRIPTION OF THE DRAWINGS

The invention will in the following be further described, in a non-limiting way, and with reference to the accompanying drawings, in which.

DETAILED DESCRIPTION OF THE INVENTION

The concept of the present invention is based on successive modelling and estimation. The characteristics of each cable segment is iteratively estimated and a loop topology identification can be carried out through splitting of the task into subtasks which can be solved more easily.

The loop topology identification, in the following denoted LTI, can be broken down into the following identification/estimation tasks assuming that no load coils are present. The problems associated with load coils and the detection of such depends on the used measurement equipment, where normal xDSL modems may not have access to the required low frequencies needed for the detection of such impairments. The present invention is general and independent of access to low frequencies, and can of course be easily combined with a load coil detector. Hence the number of cable segments needs to be identified as well as the length of each segment. Furthermore the kind of the segment, for example a serial or a bridge-tap, needs to be identified and the cable type of each segment needs to be estimated, i.e. the unknown primary/secondary parameters for each segment as will be discussed more thoroughly below.

LTI can be performed based on hypothesis testing of different cable topologies. A basic algorithm is known which uses a pre-stored cable database and tests different combinations and selects the one that best meets a defined criteria, e.g. U.S. Pat. No. 6,724,859. According to the present invention, a model-based method is instead proposed for LTI, which means that the large cable database can be avoided and it is also possible to adapt to unknown cable types, temperature variations, variations due to ageing etc. which factors can be very difficult to take into account and to store in a database.

Figure 1:
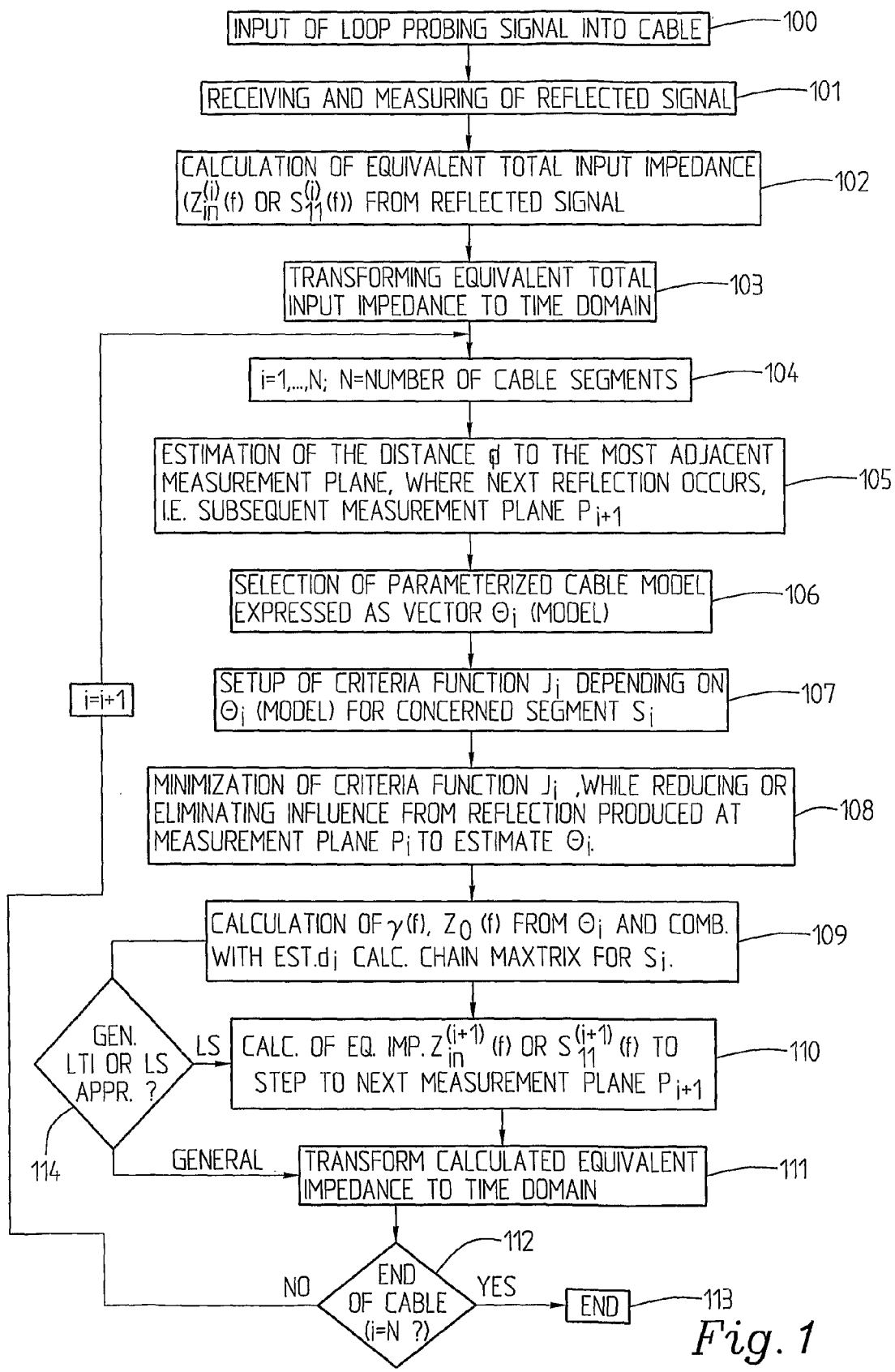
FIG. 1 is a flow diagram schematically describing one embodiment of the present invention.

However, in order to explain the functioning of the inventive concept, reference is made to the flow diagram of FIG. 1. It is thus supposed that a measuring equipment comprising a measuring device or a front end device is connected to a modem for transmitting probing signals onto the loop or the transmission line (cable), 100. The cable may for example comprise a conventional copper line comprising a number of cable segments $S_1 \ldots, S_N$, N being the total number of segments and it has certain properties, for example signal attenuation in different frequency ranges. It is intended to establish line or cable properties, such as the lengths of the individual segments, signal attenuation and transmission capacity and transmission characteristics along the line and their location. The measuring equipment may be provided at the transceiver end of the line or cable although it does not necessary have to be incorporated in a transceiver, it can also be provided for separately, optionally in communication with the transceiver etc. Other means may also be used for voltage/current generation to allow for input of a probing signal. Advantageously the measurement is performed as a so called single-ended loop test, SELT. The parameters relating to the line input impedance, here covered by the concept of the equivalent total input impedance $Z_{in}^{(1)}(f)$, $(Z_{in}^{(1)}(f))^2$ or $S_{11}^{(1)}(f)$ will be evaluated using the reflected echo signal, 101, which is reflected back over the line or the cable segments. The frequency dependent equivalent total input impedance can be calculated from a measurement of the frequency dependent reflected signal, 102. According to different embodiments the equivalent total impedance comprising; $Z_{in}^{(1)}(f)$, $(Z_{in}^{(1)}(f))^2$ or the scattering signal $S_{11}^{(1)}(f)$, is calculated. Also other possibilities should be covered by the concept "equivalent input impedance".

The patent application No. PCT/SE2004/000296 with priority from U.S. 60/469,658 "Method and arrangement for signal loop test" by the same applicant describes an example of how, with the use of an xDSL modem, the reflected signal or the echo signal can be measured and hence indirectly the equivalent total impedance as referred to above. Briefly, an echo transfer function $H_{echo}(f)$ for the actual line or cable is generated. This is calculated by performing a frequency translation of the broadband signals $V_{in}$ and $V_{out}$ resulting in signals $V_{in}(f)$ and $V_{out}(f)$ in the frequency domain. The transfer function is generated by the relationship $H_{echo}(f)=V_{out}(f)/V_{in}(f)$, where the frequency is denoted f. The transfer function may of course include properties of the transceiver, (in this case).

A frequency domain model of the echo transfer function $H_{echo}(f)$ is used to calculate the frequency dependent impedance, here denoted equivalent total impedance $Z_{in}^{(1)}(f)$ of the cable or of the loop as seen by the measurement equipment or the transceiver. The input impedance can then be used for calculating several loop qualification parameters. This frequency domain model of the echo transfer function includes three parameters, $Z_{h0}(f)$, $Z_{hyb}(f)$ and $H_\infty(f)$ which all relate to the transceiver. The parameters, transceiver model values, fully describe the transceiver from this point of view. The above mentioned parameters are originally deduced analytically from the transceiver circuits with some minor simplifications. Hence an echo transfer function can be simulated in different manners. Normally the values of the parameters are not calculated directly from the component values of the transceiver, but generated from measurements in a calibration process. The standardization paper "How is G.selt to specify $S_{11}$ (calibrated measurements)?" by T. Pollet, ITU Telecommunication Standardization Sector, Temporary Document OJ-091, Osaka, Japan 21-25 Oct., 2002 describes a calibration method based on a one port scattering parameter (signal) $S_{11}$ including transceiver parameters which are generated during a calibration. In this document, the scattering parameters $S_{11}$ is expressed with three parameters C1, C2 and C3 for the transceiver. These parameters should not be confused with the transceiver model values $Z_{h0}(f)$, $Z_{hyb}(f)$ and $H_\infty(f)$ as referred to above. The parameters C1, C2 and C3 are dimensionless quantities and they are not given any concrete meaning although they are successfully used to model the transceiver.

The transceiver model values of the present description are recognized in the analysis and can be interpreted directly:

The parameter $H_\infty(f)$ is the frequency dependent echo transfer function for the transceiver with open connection to the line or to the cable, i.e. when the line impedance has an unlimited magnitude.

$Z_{hyb}(f)$ is the transceiver impedance as measured at the connections to the line, i.e. the transceiver impedance at the first measurement plane.

$Z_{h0}(f)$ can be expressed as $Z_{h0}(f)=H_0(f)\times Z_{hyb}(f)$, in which the value $H_0(f)$ is the frequency dependent echo transfer function for the transceiver with connections to the line short-circuited and $Z_{hyb}(f)$ as defined above.

The transceiver model values are not measured directly, but generated in a process wherein $H_{echo}(f)$ can be expressed as:

$$H_{echo}(f) = \frac{H_\infty(f)Z_{in}(f) + Z_{h0}(f)}{Z_{in}(f) + Z_{hyb}(f)}$$

wherein $Z_{in}(f)$ is the input impedance of the line as a function of the frequency f and $Z_{h0}(f)$, $Z_{hyb}(f)$ and $H_\infty(f)$ are complex vectors forming the transceiver model values.

It should be clear that the equivalent total input impedance (expressed as an impedance or as a scattering signal/parameter) can be calculated in any appropriate manner from the reflected echo signal, the above merely refers to one particular example, 102.

Then the defined frequency domain TDR signal is calculated based on the equivalent total input impedance and thereafter transformed to time domain, i.e. dependent on time instead of on frequency, 103. It could also be some other plane or domain, the main thing being that it allows for estimation of cable segment lengths. Preceding the transforming step, a filtering step may be performed in any appropriate manner in order to filter out undesired components and to improve the quality of the reflected signal. How this is done or if it is necessary, is not of significance for the present inventive concept, although it may of course influence the outcome of the estimations so the skilled man may perform a filtering in any appropriate manner.

However, once the total input impedance, here denoted equivalent impedance since it can be the impedance itself, the square of impedance or the scattering signal or some other signal somehow relating to the input impedance or a factor thereof, that is established, iteratively and consecutively for each of the cable segments and the iteration loop is performed as briefly described below. Hence, for the first segment, an estimation of the distance from where the first, the most adjacent, with respect to the measurement equipment, reflection occurs, i.e. the subsequent measurement plane $P_{i+1}$ is performed, 104. This can also be done in any appropriate manner, for example by simple measuring the time it takes from transmission of the probing signal to the reflected signal reaching the measuring equipment divided by two, i.e. (the total time it takes for the signal to be transmitted and reflected from the reflection point divided by two). Generally this can be done in any appropriate manner.

Then a parameterized cable model expressed as a vector $\overline{\theta}_{i(model)}$, is selected, 105. Any appropriate cable model with a number of unknown parameters can be used as will be discussed later in the specification. Moreover a criteria function $J_i$ is set up depending on selected model, $\bar{\theta}_{i(model)}$ for the concerned segment $S_i$. It should be clear that which criteria function that is set up depends on the selected parameterized cable model, 106. It is also specific for the respective cable segments $s_i$. This criteria function will be used to determine the parameters of the cable model represented as a vector and to reduce influence of the reflection produced at the measurement plane in question, to estimate $\bar{\theta}_i$. This is performed by minimizing the criteria function $J_i$ for segment $s_i$ (between $n_i$ and $n_{i+1}$), 107.

Then at least the propagation constant $\gamma(f,\bar{\theta}_i)$ and the characteristic impedance $Z_0(f,\bar{\theta}_i)$ is calculated from $\bar{\theta}_i$. Subsequently the corresponding chain matrix is calculated by using estimated information (for example via TDR) about $d_i$, the length of $s_i$ or the distance between measurement plane $p_i$ and measurement plane $p_{i+1}$.

If the low complexity analytical least square LTI algorithm is utilized the (updated) equivalent impedance, e.g. $Z_{in}^{(i+1)}(f)$ or $S_{11}^{(i+1)}(f)$ is calculated in order to step to the next measurement plane, or to the next cable segment, 110. If a general LTI or an Analytical Least Square (ALS) approach is to be used is established, 114. If hence instead the general model based LTI algorithm is used, no (virtual) stepping of the measurement plane is necessary and the total chain matrix is calculated, 115.

Thereafter (after step 110 or 115 respectively) the respective equivalent total input impedance, expressed as an impedance or as a scattering signal (for example) is transformed to the time domain, 111. Then it is established if the end of the cable has been reached (i.e. if i=N, measuring plane $P_{N+1}$), 112, which can be done in any appropriate manner, and if yes, the procedure ends, 113, otherwise i is increased by one (i=i+1) and the procedure is repeated as from step 104 above. It should be clear that the step of calculation of the equivalent impedance, 110, serves to virtually move the measurement plane one step ahead. The estimated respective distance $d_i$ established in step 105 is provided to step 109 which further requires information about the propagation constant or the propagation velocity, the characteristic impedance (and the distance) in addition to the total input equivalent impedance in order to enable calculation of the subsequent equivalent total input impedance as seen from the subsequent measurement plane.

When the end of the cable has been found, the found equivalent total input impedance value actually corresponds to the impedance of the terminal end opposite to the measurement equipment which it is extremely advantageous to be able to establish.

Figure 2:
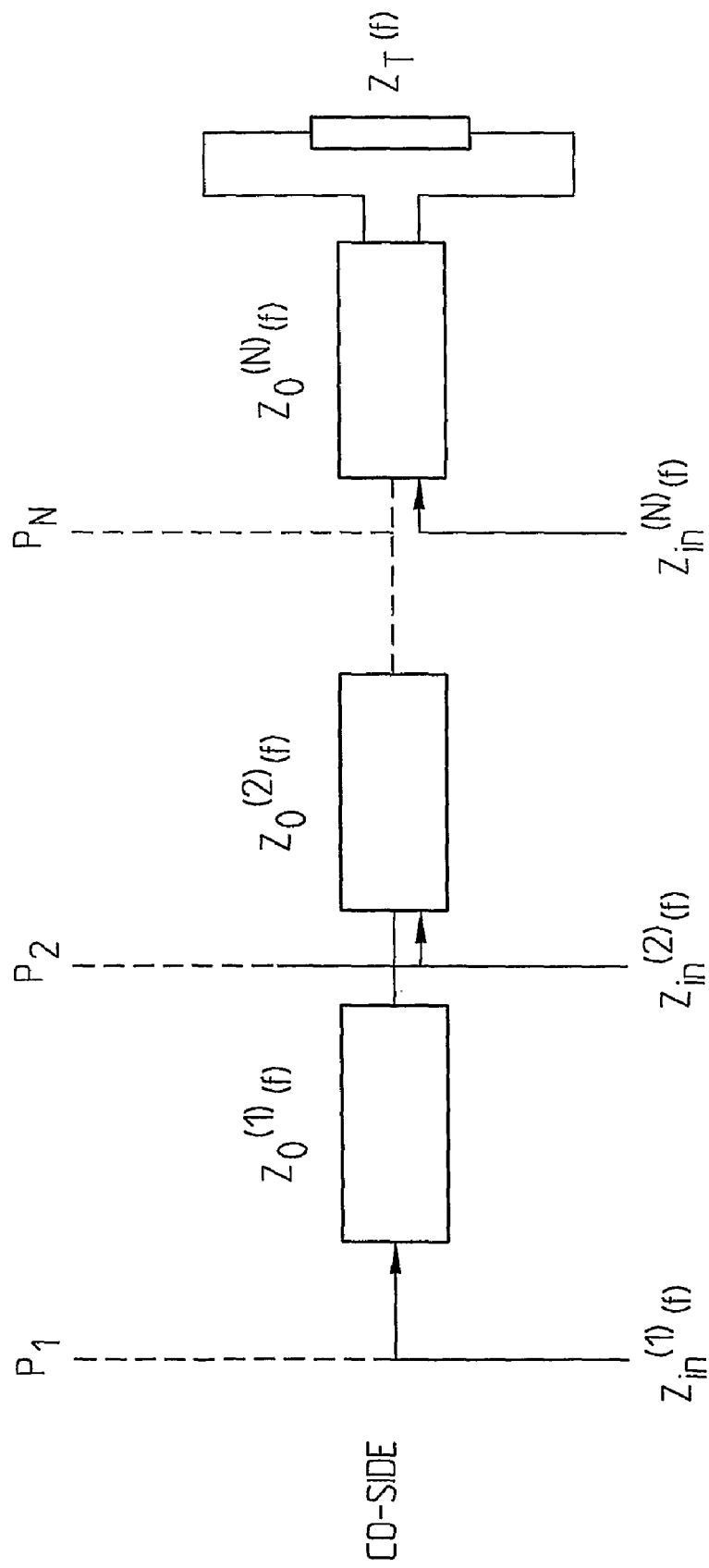
FIG. 2 is a block diagram schematically illustrating successive modelling and calculation based on an iterative algorithm for a transmission line comprising number of cable segments, FIG. 3 for explanatory reasons shows a transmission line model.
Figure 3:
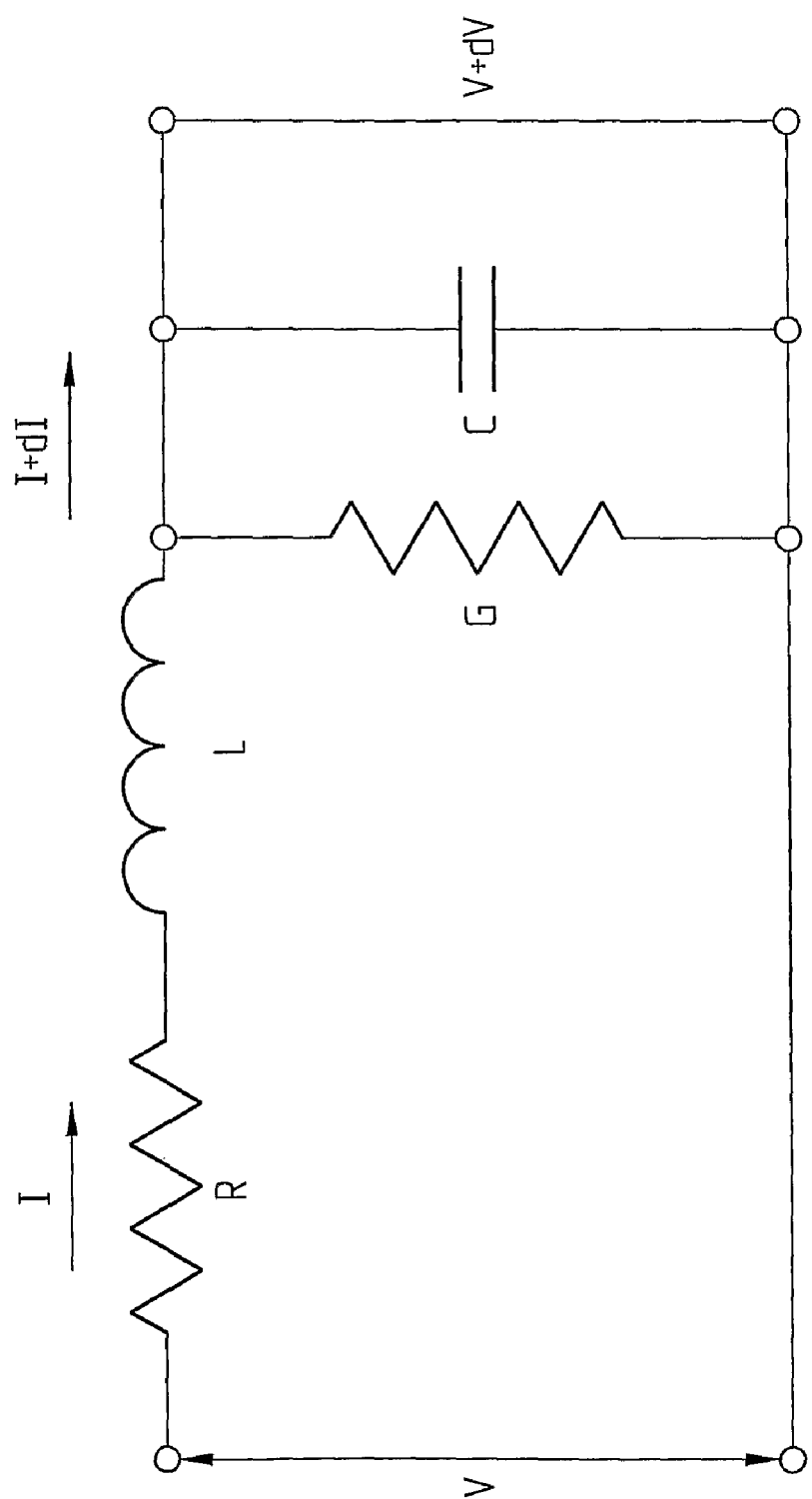

FIG. 2 very schematically illustrates a block diagram over a cable comprising N cable segments. As a background, reference is herewith first made to the transmission line model in FIG. 3.

It is known that a transmission line can be described by per-unit-length parameters; a series resistance R, a series inductance L, a shunt conductance G and a shunt capacitance C. An analysis of the circuit in FIG. 3 will give the propagation constant $\gamma=\sqrt{(R+j\omega L)\cdot(G+j\omega C)}$ and the characteristic impedance $Z_0=\sqrt{(R+j\omega L)/(G+j\omega C)}$. The transmission line model comprises cascaded infinitesimal R,L,G,C sections. A transmission line can then be described with a two-port in chain matrix form as:

$$\begin{bmatrix} V(0) \\ I(0) \end{bmatrix} = \begin{bmatrix} \cosh(\gamma d) & Z_0 \cdot \sinh(\gamma d) \\ \frac{1}{Z_0} \cdot \sinh(\gamma d) & \cosh(\gamma d) \end{bmatrix} \cdot \begin{bmatrix} V(d) \\ I(d) \end{bmatrix}$$

where d is the cable length. The term $\gamma d$ is called the electrical length of the transmission line. To describe a cable with several segments, the individual chain matrices can be multiplied.

In order to describe the input impedance of a multi-segment cable, a two-port theory utilizing the known chain matrix rule can be used. For a cable comprising N segments, this known theory states that the input impedance seen from the Central Office (CO) side can be calculated as:

$$Z_{in}(f) = \frac{A \cdot Z_T(f) + B}{C \cdot Z_T(f) + D}$$

$Z_T(f)$ is the far-end termination impedance and the chain matrix parameters A, B, C and D represent the cascaded connection of all segments, i.e.:

$$\begin{bmatrix} A & B \\ C & D \end{bmatrix} = \begin{bmatrix} A_1 & B_1 \\ C_1 & D_1 \end{bmatrix} \cdot \begin{bmatrix} A_2 & B_2 \\ C_2 & D_2 \end{bmatrix} \cdot \ldots \cdot \begin{bmatrix} A_N & B_N \\ C_N & D_N \end{bmatrix}$$

Now with reference to FIG. 2, N different measurement points, or measurement planes (here $P_1$, $P_2$, $P_N$ shown) of the cable are defined.

Each of the N cable segments is represented by its characteristic impedance denoted $Z_0^{(i)}(f)$ for segment i.

Thus, the input impedance seen at the measurement plane number i ($P_i$), looking towards the customer side, is defined as follows:

$$Z_{in}^{(i)}(f) = \frac{A^{(i,N)} \cdot Z_T(f) + B^{(i,N)}}{C^{(i,N)} \cdot Z_T(f) + D^{(i,N)}}, \text{ for } i = 1, 2, \ldots, N$$

The chain matrix calculated from measurement plane i gives:

$$\begin{bmatrix} A^{(i,N)} & B^{(i,N)} \\ C^{(i,N)} & D^{(i,N)} \end{bmatrix} = \begin{bmatrix} A_i & B_i \\ C_i & D_i \end{bmatrix} \cdot \begin{bmatrix} A_{i+1} & B_{i+1} \\ C_{i+1} & D_{i+1} \end{bmatrix} \cdot \ldots \cdot \begin{bmatrix} A_N & B_N \\ C_N & D_N \end{bmatrix}$$

According to the used definition $Z_{in}^{(N+1)}(f)=Z_T(f)$,

It should be noted that in order to calculate the input impedance $Z_{in}^{(i+1)}(f)$, the characteristic impedance $Z_0^{(i)}(f)$, the propagation constant $\gamma^{(i)}(f)$ and the distance $d^{(i)}$, of each segment are needed.

According to the present invention $Z_{in}^{(1)}(f)$, $(Z_{in}^{(1)}(f))^2$ or $S_{11}^{(1)}(f)$ is calculated from the measurement of the reflected signal giving the echo transfer function which can be done for example as described above, and after establishing the distance (segment length or distance between consecutive measurement planes), setting up a parameterized model, minimization of the corresponding criteria function applied on the model, the respective characteristic impedance, and propagation constant, which hence can be estimated via iterative estimation of the subsequent cable segment, the equivalent input impedance can be estimated or calculated for the subsequent cable segment. The procedure is repeated by establishing the distance, using the modelling minimization of the "subsequent" criteria function to find the subsequent characteristic impedance and propagation constant in order to calculate the chain matrix, and in case of an analytical least square approach, determine the next equivalent total input impedance etc. until the end termination is reached.

According to the present invention the LTI procedure, consisting of the general or the analytical least square algorithm, can be said to be split into two parts. A criteria function is derived, the unknown parameters of which representing the first cable segment connected to the measurement plane. Subsequently the used method is extended to an iterative process including successive modelling and estimation in order to identify or estimate the subsequent cable segments consecutively towards the termination.

First the procedure for estimation of the first cable segment will be discussed. A serious problem of the TDR method, especially when applied for telecommunication cables having a distributed RLC-nature, is the strong reflected signal caused by the impedance mismatch between the SELT equipment output impedance (if a SELT is used; the inventive concept is however not restricted thereto) and the characteristic impedance of the first cable segment.

In the following an embodiment will be discussed in which a one-port scattering signal denoted $S_{11}^{(1)}(f)$ is used as an equivalent total input impedance. The frequency dependent output impedance of the SELT equipment is here denoted $Z_{out}(f)$. The input impedance of the cable, seen from the SELT equipment, is denoted $Z_{in}^{(1)}(f)$. The one-port scattering signal measured by the SELT equipment can then be expressed as:

$$S_{11}^{(1)}(f) = \frac{Z_{in}^{(1)}(f) - Z_{out}(f)}{Z_{in}^{(1)}(f) + Z_{out}(f)}$$

Preferably $S_{11}^{(1)}(f)$ is filtered before being transformed to the time domain using inverse Fourier transform.

In practice Fast Fourier Transform (FFT/IFFT) algorithms may be used for implementation of the inverse Fourier transform. Furthermore, the inverse Fourier transform can be performed with/without Hermitian extension of $S_{11}^{(1)}(f)$.

It should be noted that the frequency domain signals can advantageously be filtered with an appropriate filter to improve the results. The far-end reflection may not be visible due to a so called slowly decaying signal, denoted Slowly Decaying Tail, SDT. The complications produced by SDT can be overcome in different ways. In one preferable embodiment the SDT can be modelled and subtracted from the signal. In order to model the tail, below it will be explained how analytical expressions can be derived.

The SELT equipment will be perfectly matched to a cable if $Z_{out}(f)$ equals $Z_0^{(1)}(f)$, i.e. is matched to the characteristic impedance of the first segment. The SDT will be zero only under this matching condition. However, $Z_{out}(f)$ of the SELT equipment can normally not be changed since it is implemented by analog electronics. In case the SELT equipment is not perfectly matched the first reflection, i.e. the SDT, can be calculated accordingly:

$$S_{SDT}(f) = \frac{Z_0^{(1)}(f) - Z_{out}(f)}{Z_0^{(1)}(f) + Z_{out}(f)}$$

Hence, in order to handle the impedance mismatch, $S_{SDT}(f)$ can be calculated according to the formula above and subtracted from the measured signal. The clean signal, SDT "removed", can be expressed as:

$$S_{TDR}^{(1)}(f) = S_{11}^{(1)}(f) - \frac{Z_0^{(1)}(f) - Z_{out}(f)}{Z_0^{(1)}(f) + Z_{out}(f)}$$

The only unknown parameter in this formula is the frequency dependent characteristic impedance of the first segment, $Z_0^{(1)}(f)$. The calculation thereof will be described further below.

Figure 4:
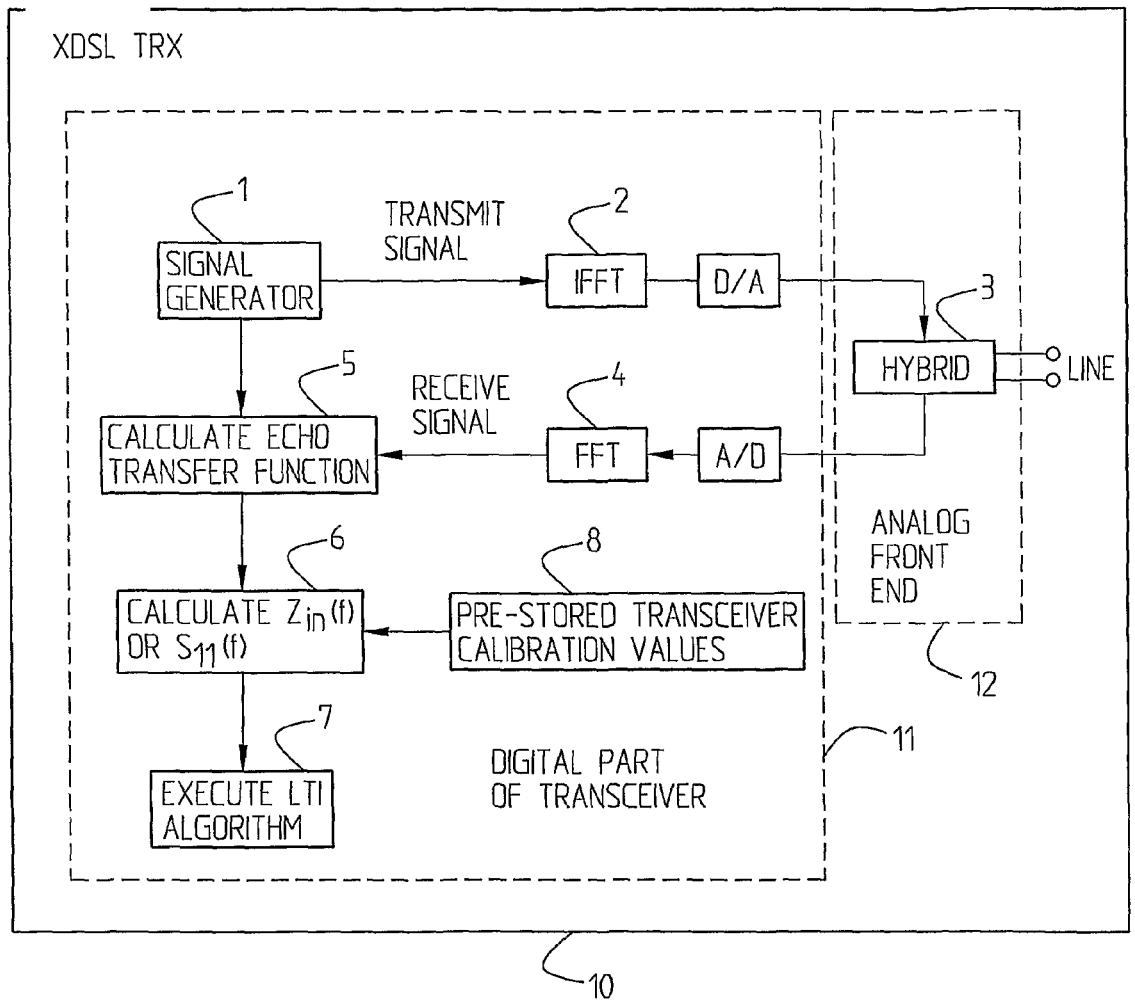
FIG. 4 is a block diagram very schematically illustrating an exemplary system according to the invention.

FIG. 4 shows a simple block diagram of a system according to one embodiment of the invention as associated with a transceiver 10 at a central office, connected to a remote device (end termination) at a customer's premises (not shown) via a digital subscriber line (DSL). The transceiver includes a digital part 11, a codec and an analog part 12, the so called Analog Front End AFE. The digital part 11 includes a digital signal generator 1 for generation of a (broadband) loop probing signal, or transmit signal which, after transformation to time domain by IFFT 2 and conversion in a D/A-converter via hybrid unit 3 in the analog front end 12 is sent out on the line to the remote device (end termination). A reflected (broadband) probing signal is received via the hybrid unit 3 in the analog front end 12, converted in A/D-converter and transformed by FFT 4 to the frequency domain.

Using the transmit signal from the signal generator, and the received echo signal, the echo transfer function is calculated in means 5 therefore. Using the echo transfer function the equivalent input impedance is calculated in calculation means 6. Subsequently the LTI algorithm is executed by algorithm executing means 7 according to the inventive concept as more thoroughly described with reference to FIG. 1 above.

Figure 5:
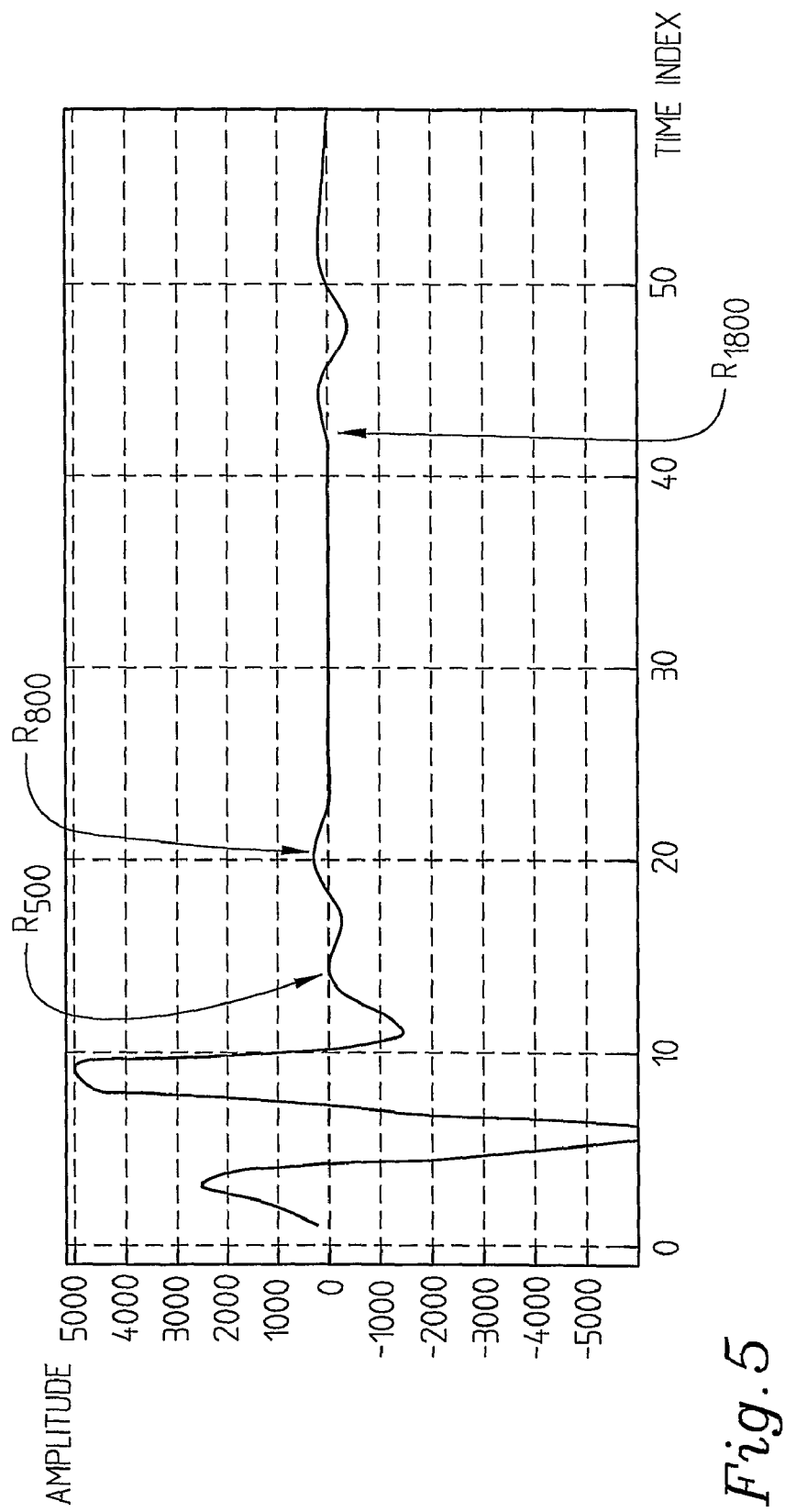
FIG. 5 is a diagram illustrating the original reflected TDR signal with partly overlapping reflections as a function of time, i.e. the $0^{th}$ iteration.

FIG. 5 is a diagram illustrating the normalized amplitude (the exact values are in these examples not important) and time resolution of an original filtered reflected TDR signal, i.e. iteration 0, as a function of a time index. It is here supposed that the cable segment comprises three segments, the first cable segment which is 0.5 km long with a thickness of 0.4 mm, the second segment which is 0.3 km long and has a thickness of 0.5 mm, and the third segment which is 1 km long and has a thickness of 0.63 mm. It should be noted that the reflections at 0.5 km ($R_{500}$) (at the end of the first segment) and at 0.8 km ($R_{800}$) (at the end of the second segment) partly overlap due to SDT. The third reflection occurring at 1.800 m, i.e. at the end of the third segment, is also indicated in the figure $R_{1800}$. It should be noted that it can hardly be noticed. Hence, Slowly Decaying Tails at connection points hide reflections, i.e. there are over-lapping echoes.

Figure 6:
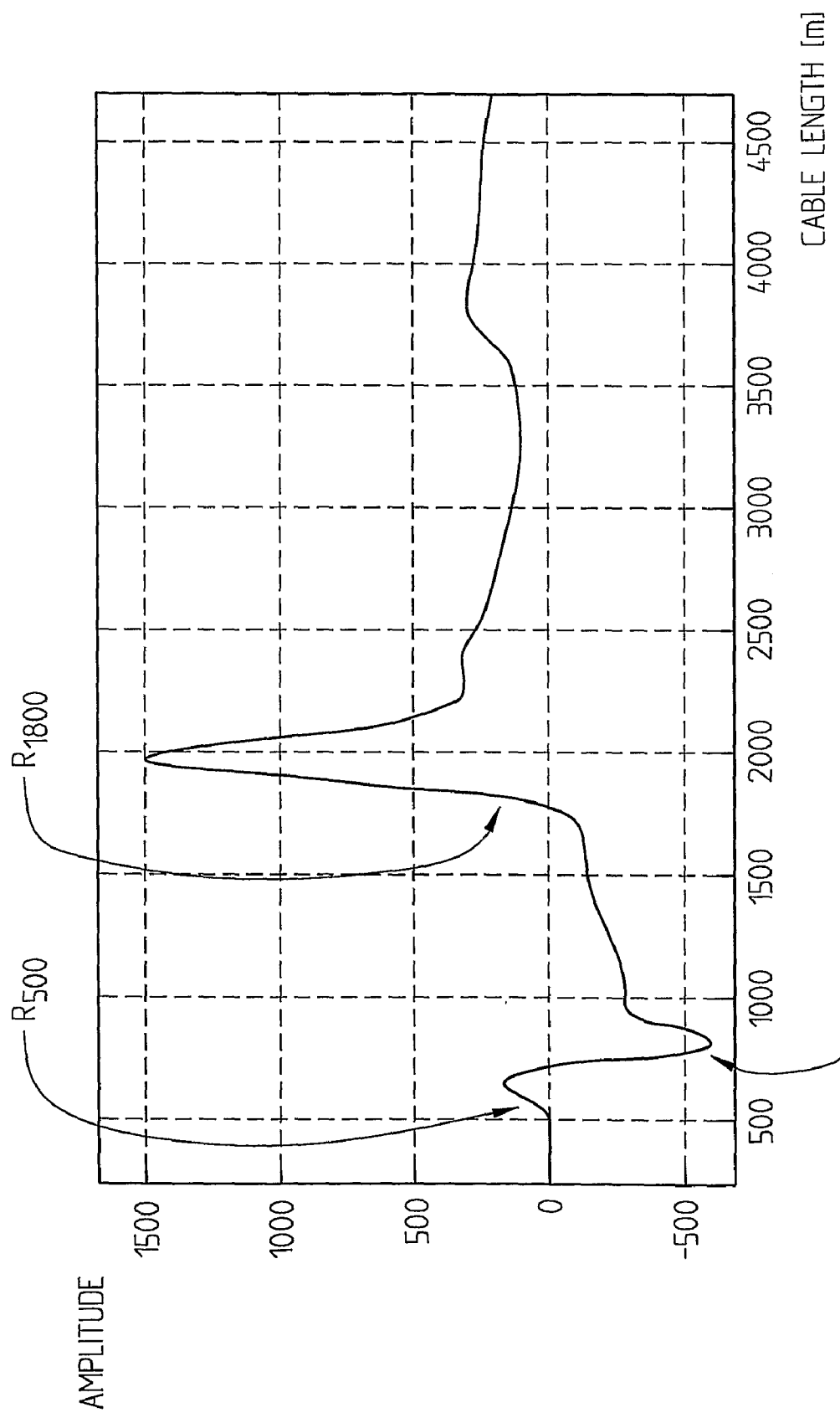
FIG. 6 is a diagram illustrating the signal amplitude as a function of cable length wherein the inventive concept is implemented, at the first iteration.

FIG. 6 shows the TDR amplitude as a function of cable length in meters for the cable described above after a first iteration. As can be seen the reflections at 500, 800, 1800 m ($R_{500m}$, $R_{800m}$, $R_{1800m}$), here can be distinguished from one another. In this case it is supposed that an analytical least square approach has been used as will be more thoroughly explained below.

Figure 7:
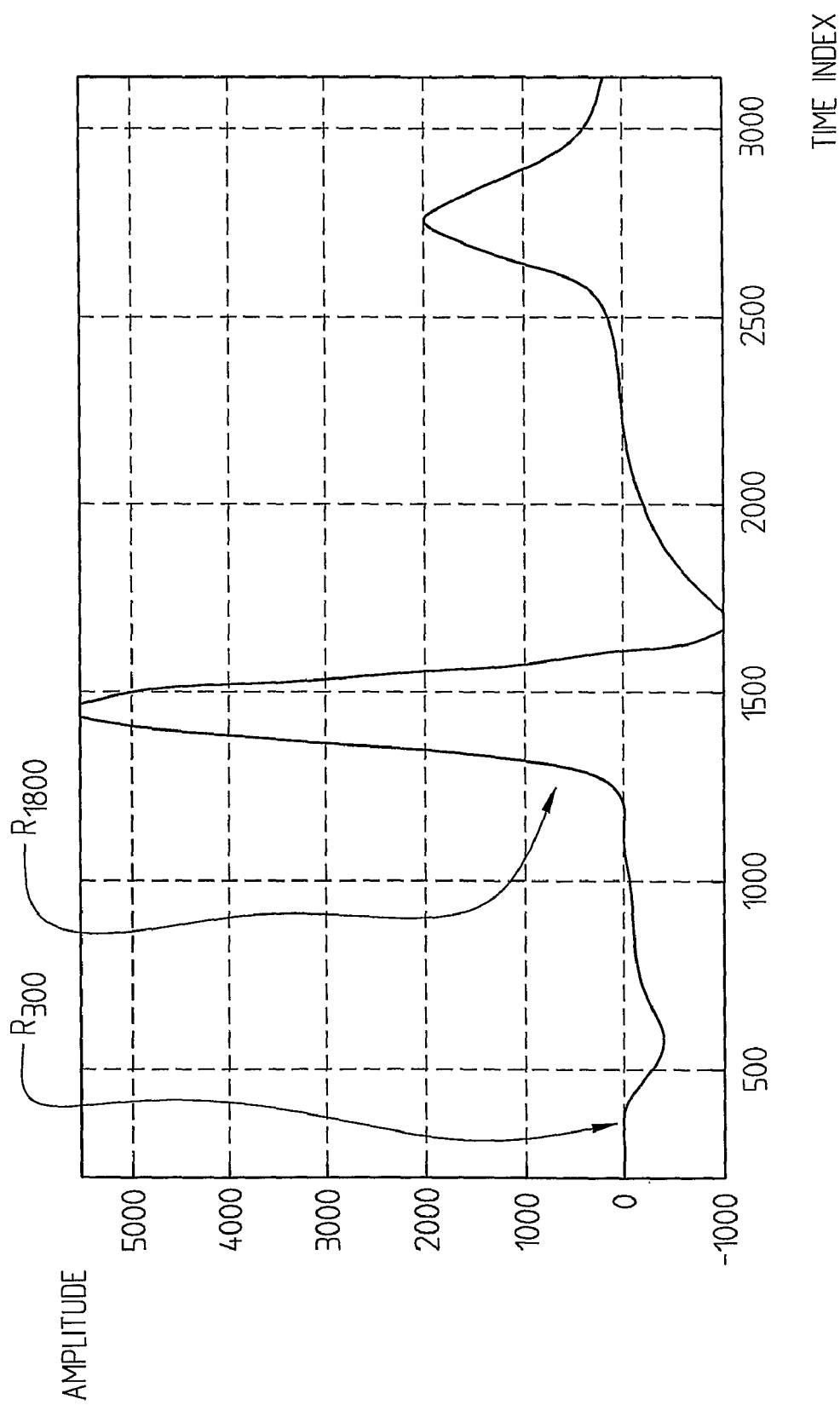
FIG. 7 is a diagram illustrating the signal amplitude as a function of time at the second iteration.

FIG. 7 shows the TDR amplitude as a function of time index for the same cable as in FIGS. 5 and 6 after the second iteration. The segment 2 reflection at 300 m and the segment 3 reflection are no more than slightly perceivable whereas the reflection at 1800 m, $R_{1800}$ is strongly pronounced. The reflection at 300 m corresponds to the measurement plane between segments 2 and 3. The measurement plane has thus been virtually moved one step further towards the termination.

The modelling of the characteristic impedance will now be more thoroughly explained. In practice the characteristic impedance of the first segment $Z_0^{(1)}(f)$ is not known in advance. According to the invention, in one embodiment, it can be estimated through model estimation of the unknown model parameters of the parameterized model. Since the $Z_0^{(1)}(f)$ signal only depends on the primary parameters of the first segment, the model has a reasonable low order. This could be compared to the modelling of $Z_{in}^{(1)}(f)$, which depends on the primary parameters of all segments, segment lengths, in addition to the far-end termination impedance. This of course is much more difficult to estimate.

In one embodiment an ETSI model with the primary parameters defined for example in ITU-T G.996.1 is used. The formal description of a cable can in practice be somewhat simplified without adversely affecting accuracy. For instance capacitance per unit length may be considered as constant at the same time as conductance per unit length is neglected. Without losing generality the primary parameters, in this ETSI embodiment, are assumed to be:

$$R(f) = \sqrt[4]{r_{oc}^4 + a_c \cdot f^2}$$

(Resistance per unit length)

$$L(f) = \frac{L_0 + L_\infty \cdot \left(\frac{f}{f_m}\right)^b}{1 + \left(\frac{f}{f_m}\right)^b}$$

(Inductance per unit length)

$$C(f) = C_{const}$$

(Capacitance per unit length)

$$G(f) = 0$$

(Conductance per unit length)

The set of unknown model parameters is denoted with a vector, which in this case yields:

$$\bar{\theta} = \{r_{oc}, a_c, L_0, L_\infty, f_m, b, C_{const}\}$$

As can be seen this is a vector with seven unknown parameters corresponding to a 7-dimensional optimization problem which is difficult to solve. Therefore, in order to lower the model order, i.e. reduce the number of unknown parameters, a so called Hilbert transform can be used. Since the transmission line is a causal and linear system, the real part of the serial/shunt impedance is related to the imaginary part of the serial/shunt impedance and vice versa. The relation can be described by the Hilbert transform. That means in practice that it is enough to model R(f) (or L(f)) and then calculate L(f) (or R(f)), except for an additive constant which needs to be modeled as well. Since R(f) contains less parameters than L(f) advantageously R(f) is modelled plus the additive constant, which is denoted $L_\infty$ in case this ETSI model is used. This means that the unknown set of model parameters will be:

$$\bar{\theta} = \{r_{oc}, a_c, L_\infty, C_{const}\}$$

This means that instead of a 7-dimensional optimization problems a 4-dimensional problem is obtained. As far as the ETSI model is concerned, the conductance G is set to zero. By primary parameters generally physical and/or electrical properties are meant.

By secondary parameters are meant the characteristic impedance, the propagation constant (and the length). The length or the distance is normally estimated by other means whereas the characteristic impedance and the propagation constant are obtained through estimation of the unknown model parameters, i.e. the vector $\bar{\theta}$ the unknown model parameters of which are estimated.

It should be clear that instead of this ETSI model other ETSI models as well as other, non-ETSI, models can be used, for example models adapted to fit analytical least square algorithms, which are very advantageous.

For the ETSI Hilbert model and similar models, an optimization algorithm may be required for estimating the unknown parameters. Models based on analytical least square algorithms might significantly reduce the dimensionality of the optimization problem.

In general a model with M parameters, $\bar{\theta} = \{x_1, x_2, \ldots, x_M\}$, that models the cable's physical and/or electrical characteristics can be used.

Below the set up of a criteria function for multi-dimensional optimization is described.

The criteria function to be minimized is preferably defined in the time domain, since it must make sure that only the reflection of the "first" segment (at the measurement plane between the "first" and the "next" segment) will be taken into account. The invention is not limited to a criteria function in only the time domain, for example a frequency domain criteria function or a combination in time and frequency domain can also be used.

The criteria function hence here could be defined accordingly:

$$J(\bar{\theta}) = \sum_{n=n_1}^{n_2} \mathrm{Re}^2\{s_{TDR}^{(1)}(n, \bar{\theta})\} + \mathrm{Im}^2\{s_{TDR}^{(1)}(n, \bar{\theta})\},$$

where $S_{TDR}^{(1)}(n, \bar{\theta})$ is the inverse Fourier transform of $S_{TDR}^{(1)}(f, \bar{\theta})$.

Here, the defined TDR signal yields $$S_{TDR}^{(1)}(f, \bar{\theta}) = S_{11}^{(1)}(f) - \frac{Z_0(f, \bar{\theta}) - Z_{out}(f)}{Z_0(f, \bar{\theta}) + Z_{out}(f)}$$

The transformation to time domain can be done with or without Hermitian symmetry of $S_{TDR}^{(1)}(f, \bar{\theta})$. In the later case we will arrive at a complex valued time signal, which the above criteria function can handle as well.

It should be noted that the two time indices used in the criteria function, denoted $n_1$ and $n_2$ should essentially cover the time interval of the SDT signal, i.e. $n_2$ should idealized be specified to the time index before the first reflection. In practice filtering of $S_{11}^{(1)}(f)$ with a high time-resolution filter may be needed in order to determine $n_2$.

It should also be noted that, in practice, $S_{TDR}^{(1)}(f, \bar{\theta})$ contains a bandwidth corresponding to half the sampling frequency of the SELT equipment.

An example of analytical least square based modelling will now be discussed.

Here the TDR signal, defined at measurement plane i, is expressed as $$Z_{in}^{(i)}(f) \cdot Z_{in}^{(i)}(f)$$

Measurement planes have been defined earlier in the application. To remove the slowly decaying tail (SDT), occurring at measurement plane i, the cable dependent signal $$Z_{STD}^{(i)}(f) = Z_0^{(i)}(f) \cdot Z_0^{(i)}(f)$$

could be estimated. By using the square of $Z_0$ we get rid of the square-root sign normally used in the calculation of $Z_0$. This is the key to lower the dimension of the optimization problem.

In the following a parameterized model is derived for $Z_{SDT}^{(i)}(f)$ and $z_{SDT}^{(i)}(t)$, intended for estimation of cable dependent parameters, i.e. physical and/or electrical characteristics of the cable. To simplify the expressions the measurement plane indexing will be omitted.

Considering the frequency dependent function;

$$Z_0^2(f) = Z_0(f) \cdot Z_0(f),$$

where the characteristic impedance is defined by its primary parameters accordingly:

$$Z_0(f) = \sqrt{(R+j2\pi f L)/(G+j2\pi f C)}$$

In general the resistance per unit length is modeled as $$R(f) = R_0 \cdot Q(f, a_f)$$

By utilizing the Hilbert transform the inductance per unit length can be modeled as:

$$L(f) = R_0 \cdot \Lambda(f, a_f) + L_\infty,$$

where $\Lambda(f, a_f)$ is obtained by means of Hilbert Transform of $Q(f, a_f)$.

This means that the general cable model consists of the three parameters $\{R_0, a_f, L_\infty\}$.

For example, the ETSI model defines $$R(f) = \sqrt[4]{r_{oc}^4 + a_c \cdot f^2}$$
$$= R_0 \cdot \sqrt[4]{1 + a_f \cdot f^2}$$
$$= R_0 \cdot Q(f, a_f),$$

where the last equation just expresses the resistance per unit length as a function of the two constants, denoted $R_0$ and $a_f$.

Using the above expressions for $R(f)$ and $L(f)$ in the definition of $Z_0^2(f)$, assuming that $G=0$, gives:

$$Z_0^2(f) = \frac{R_0 \cdot Q(f, a_f) + j2\pi f \cdot (R_0 \cdot \Lambda(f, a_f) L_\infty)}{j2\pi f \cdot C}$$

The function $Z_0^2(f)$ is intended to be used in a least square criterion, in order to estimate the cable's characteristics, i.e. physical and/or electrical parameters. However, the above expression needs to be further simplified by introducing a couple of new parameters. Hence, the following parameters are defined $$\alpha_1 = \frac{R_0}{C}, \quad \alpha_2 = \frac{L_\infty}{C}$$

giving $$Z_0^2(f) = \alpha_1 \cdot \left( \frac{Q(f, a_f)}{j2\pi f} + \Lambda(f, a_f) \right) + \alpha_2 = \alpha_1 \cdot \Phi(f, a_f) + \alpha_2$$

The function $$\Phi(f, a_f) = \frac{Q(f, a_f)}{j2\pi f} + \Lambda(f, a_f)$$

has been introduced.

It should be noted that the parameters $\{a_f, \alpha_1, \alpha_2\}$ defines the cable characteristics in the current model.

It will be appropriate to filter $Z_0^2(f)$ with a filter, here denoted $H(f)$. Hence the filtered version becomes the modeled $Z_{SDT}(f) = H(f) \cdot Z_0^2(f)$ signal, that is, $$Z_{SDT}(f) = H(f) \cdot Z_0(f) \cdot Z_0(f) = \alpha_1 \cdot H(f) \cdot \Phi(f, a_f) + \alpha_2 \cdot H(f)$$

The inverse Fourier transform of the above equation yields $$z_{SDT}(t) = h(t) \otimes z_0(t) \otimes z_0(t) = \alpha_1 \cdot h(t) \otimes \Phi(t, a_f) + \alpha_2 \cdot h(t),$$

where $\otimes$ denotes the convolution operator.

It should be noted that the inverse Fourier transform can be performed with/without Hermitian symmetry leading to a real/complex valued time domain signal.

By introducing $\psi(t, a_f) = h(t) \otimes \Phi(t, a_f)$, and explicitly stating the cable characteristic behavior, the formula yields $$z_{SDT}(t, a_f, \overline{\alpha}) = h(t) \otimes z_0(t) \otimes z_0(t) = \alpha_1 \cdot \psi(t, a_f) + \alpha_2 \cdot h(t),$$

where the signal $Z_{SDT}(t, a_f, \overline{\alpha})$ thus depends on the cable dependent parameters $a_f$ and $\overline{\alpha} = [\alpha_1, \alpha_2]^T$.

By utilizing the model described above the criteria function can be expressed as $$J(a_f, \alpha_1, \alpha_2) = \sum_{n=n_1}^{n_2} (h(n) \otimes z_{in}(n) \otimes z_{in}(n) - \alpha_1 \cdot \psi(n, a_f) - \alpha_2 \cdot h(n))^2,$$

where $h(n)$ is the impulse response of the defined filter and $\otimes$ denotes the convolution operator.

With strict vector notation, omitting the time dependence $n_1$ and $n_2$, this can be written as $$J(a_f, \alpha_1, \alpha_2) = (\overline{r} - A(a_f)\overline{\alpha})^T (\overline{r} - A(a_f)\overline{\alpha})$$

Where $$\overline{r} = [h(n_1) \otimes z_{in}(n_1) \otimes z_{in}(n_1), \ldots, h(n_2) \otimes z_{in}(n_2) \otimes z_{in}(n_2)]^T$$

$$A(a_f) = \begin{bmatrix} \psi(n_1, a_f) & h(n_1) \\ M & M \\ \psi(n_2, a_f) & h(n_2) \end{bmatrix} \text{ and}$$

$$\overline{\alpha} = [\alpha_1 \alpha_2]^T$$

The minimization of function $J(a_f, \alpha_1, \alpha_2)$ can be solved analytically as a least square (ALS) solution for a fixed value of the parameter $a_f$, that is $$\overline{\alpha}(a_f) = [Re(A(a_f)^H A(a_f))]^{-1} Re(A(a_f)^H \overline{r})$$

where H denotes conjugate transpose.

Without loss of generality it will from now on be assumed, for simplicity, that the matrix A and the vector r are real valued. The complex case can be handled similarly by introducing the real-operator as above.

By fixing the parameter $a_f$ the problem has been reduced to one dimension, which can easily be solved with low complexity. For example, the parameter $a_f$ can be set to span the region from $a_{f\,min}$ to $a_{f\,max}$ and then the solution that gives the minimum value of $J(a_f,\alpha_1(a_f),\alpha_2(a_f))$ can be selected. In general this one dimensional problem can be solved as follows:

$$a_{f_{LS}} = \underset{a_f}{\operatorname{argmin}} J(a_f, \alpha_1(a_f), \alpha_2(a_f))$$

and using $a_{f_{LS}}$ to calculate:

$$\overline{\alpha}_{LS} = (A(a_{f_{LS}})^T A(a_{f_{LS}}))^{-1} A(a_{f_{LS}})^T \overline{r}$$

Hence the above described analytically least square cabel model can be represented by the vector $\overline{\theta} = [a_f, \alpha_1, \alpha_2]^T$.

Yet another cable model suited for an analytically least square estimation algorithm can be derived from the twisted pair model described on page 69 in "Frequency Domain Identification of Transmission Lines from Time Domain Measurements", Patrick Boets, May 1997, Vrije University of Brussels Belgium. By using our previous definitions the cabel model can be expressed with the same equation as above, but with $a_f$ now being a vector. That is $$Z_0^2(f) = \alpha_1 \cdot \Phi(f, \overline{a}_f) + \alpha_2$$

But now with the following definitions $$\Phi(f, \overline{a}_f) = \frac{1}{(a_3\sqrt{-s})} \frac{B_0}{B_1} + \frac{1}{2} \cdot \frac{3a_2^3 B_2 B_3 + 2a_2 B_1 B_2 + a_2^2 B_0 B_3}{a_2^3 B_2 B_3 + a_2 B_1 B_2 + a_2^2 B_0 B_3 + B_0 B_1}$$

$$a_1 = \frac{a_1 a_3}{C^2 d^2}, \alpha_2 = \frac{a_4}{C^2 d^2},$$

where $$s = j2\pi f, \overline{a}_f = [a_2 a_3]^T$$

$B_k$ is the Bessel function of order k with argument according to $$B_k = B_k(a_3\sqrt{-s})$$

Here, C is the capacitance per unit length and d is the cable (segment) length.

By applying the model above on the previously defined criteria function we get the following least square solution $$\overline{a}_{f_{LS}} = \underset{\overline{a}_f}{\operatorname{argmin}} J(\overline{a}_f, \alpha_1(\overline{a}_f), \alpha_2(\overline{a}_f))$$

and $$\overline{\alpha}_{LS} = (A(\overline{a}_{f_{LS}})^T A(\overline{a}_{f_{LS}}))^{-1} A(\overline{a}_{f_{LS}})^T \overline{r}$$

Note that in this case is the minimization of J carried out over two dimensions instead of just one. However, this is still a low complexity operation compared to multi dimensional optimization.

Thus, the cable model above can be described by the following vector $\overline{\theta} = [a_2, a_3, \alpha_1, \alpha_2]^T$, where the vector elements are defined above.

It should be noted that with the ETSI model, it is not possible to estimate R,L and C exactly. This can be solved by setting for example C to a fix value and then estimate R/C and L/C of the cable segment. Other solutions are of course also possible, for example instead L could be set to a fixed value etc.

The method for modelling and estimating the first cable segment according to one specific embodiment was described. This will now be expanded to estimation of the other cable segments based on a similar approach. In principle the method works its way from the Central Office to the customer side with successive modelling and estimation.

The unknown parameter vector $\overline{\theta}$ is estimated at each iteration step, which corresponds to the identification of the type of cable connected to the respective measurement plane. When the first iteration is started, the measurement plane corresponds to the connection point of the SELT equipment (if such is used). Before starting the second iteration the measurement plane is virtually moved, in the analytical least square algorithm, to the connection point between the first and the second cable segment for a multi-segment cable. The respective $\overline{\theta}$ vector ($\overline{\theta}_i$) is estimated and saved at each iteration step, which enables building up a model of the cable up to the last measurement plane. We start by describing the procedure for the general iterative LTI algorithm. Thereafter follows the similar procedure for the analytical iterative least square algorithm.

The general model based iterative LTI algorithm, which typically require a multi-dimensional optimization, is described below.

Assuming that the cable has N segments, the method will identify the i:th segment based on the previous (i−1) number of $\overline{\theta}_i$ vectors, where i=1, 2, ..., N. Thus, at the i:th iteration step, the estimation process yields:

$$S_{SDT,i}^{(1)}(f, \overline{\theta}_i) = \frac{Z_{model,i}(f, \overline{\theta}_i) - Z_{ref,i}(f)}{Z_{model,i}(f, \overline{\theta}_i) + Z_{ref,i}(f)}$$

which models the reflection tail coming from consecutive measurement plane i, where $$Z_{model,i}(f, \overline{\theta}_i) = \frac{A^{(1,i-1)} \cdot Z_0(f, \overline{\theta}_i) + B^{(1,i-1)}}{C^{(1,i-1)} \cdot Z_0(f, \overline{\theta}_i) + D^{(1,i-1)}}$$

Here, $Z_{ref,i}(f)$ is equal to $Z_{out}(f)$ for i=1, and for i>1 equal to $Z_0(f,\overline{\theta}_{i-1})$ or alternatively equal to $Z_{out}(f)$. Other impedances or signals could also be substituted as $Z_{ref,i}(f)$, which slightly modifies the criteria function below.

The frequency dependent chain matrix parameters are calculated according to the definition given earlier in this document, wherein:

$$\begin{bmatrix} A^{(1,k)} & B^{(1,k)} \\ C^{(1,k)} & D^{(1,k)} \end{bmatrix} = \begin{bmatrix} A_1 & B_1 \\ C_1 & D_1 \end{bmatrix} \cdot \begin{bmatrix} A_2 & B_2 \\ C_2 & D_2 \end{bmatrix} \cdots \begin{bmatrix} A_k & B_k \\ C_k & D_k \end{bmatrix}$$

Here, according to the used definition $$\begin{bmatrix} A^{(1,0)} & B^{(1,0)} \\ C^{(1,0)} & D^{(1,0)} \end{bmatrix} = \begin{bmatrix} 1 & 0 \\ 0 & 1 \end{bmatrix}$$

Subtraction of the i:th tail yields the frequency domain signal $$S_{TDR,i}^{(1)}(f, \bar{\theta}_i) = S_{11,i}^{(1)}(f) - S_{SDT,i}^{(1)}(f, \bar{\theta}_i),$$

where $$S_{11,i}^{(1)}(f) = \frac{Z_{in}^{(1)}(f, \bar{\theta}_i) - Z_{ref,i}(f)}{Z_{in}^{(1)}(f, \bar{\theta}_i) + Z_{ref,i}(f)}$$

The relationship between the chain matrix and $\bar{\theta}$ can be described by a set of formulas depending on the specific type of model used.

The evaluation in the time domain will now be started. For this purpose we need to transform our frequency domain signals to time domain. There are two ways of doing this, with and without Hermitian symmetry. In the later case we will arrive at a complex valued time signal. The described criteria function can handle both cases.

Thus, at the i:th iteration step the criteria function yields:

$$J^{(i)}(\bar{\theta}_i) = \sum_{n=n_1}^{n_2} \mathrm{Re}^2\{s_{TDR,i}^{(1)}(n, \bar{\theta}_i)\} + \mathrm{Im}^2\{s_{TDR,i}^{(1)}(n, \bar{\theta}_i)\}$$

By minimizing $J^{(i)}(\bar{\theta}_i)$ the vector $\bar{\theta}_i$ can be estimated, which in general require a multi dimensional optimization routine.

It should be noted that in the above formula, n1 and n2 are also dependent on i, but this dependence has been omitted.

Since $\bar{\theta}_i$ is estimated at each iteration step, the respective characteristic impedance and the propagation constant can be estimated based on the equations defined for the respective model. This is combined with the estimation of the distance or length of the i:th segment, here denoted $d^{(i)}$, i.e. basically the reflection time from measurement plane (i+1) to i, which means that it is possible to calculate the corresponding frequency dependent ABCD-matrix for the currently estimated segment as:

$$\begin{bmatrix} A_i(\bar{\theta}_i, d^{(i)}) & B_i(\bar{\theta}_i, d^{(i)}) \\ C_i(\bar{\theta}_i, d^{(i)}) & D_i(\bar{\theta}_i, d^{(i)}) \end{bmatrix} = \begin{bmatrix} \cosh(\gamma(\bar{\theta}_i)d^{(i)}) & Z_0(\bar{\theta}_i) \cdot \sinh(\gamma(\bar{\theta}_i)d^{(i)}) \\ \frac{1}{Z_0(\bar{\theta}_i)} \cdot \sinh(\gamma(\bar{\theta}_i)d^{(i)}) & \cosh(\gamma(\bar{\theta}_i)d^{(i)}) \end{bmatrix}$$

In the above matrix we have emphasized the dependence on $\bar{\theta}_i$ and $d^{(i)}$.

An appropriate filter may be used in any of the steps described above to further enhance the performance of the iterative estimation process.

The iteration process is repeated for i=i+1 until the end of the transmission line is found.

The model based iterative LTI algorithm adapted for a low complexity analytical least square approach can be described as follows.

Assuming the cable has N segments the method identifies the i:th segment based on the previous (i−1) number of $\bar{\theta}_i$ vectors, where i=1, 2, ... N. Thus, at the i:th iteration step the iterative estimation procedure yields:

$$Z_{SDT}^{(i)}(f,\bar{\theta}_i) = H_i(f) \cdot Z_0(f,\bar{\theta}_i) \cdot Z_0(f,\bar{\theta}_i),$$

which models the reflection tail coming from consecutive measurement plane i. Here, $H_i(f)$ is an appropriate filter used at the i:th iteration step in order to improve the estimation results.

Subtraction of the i:th tail yields the frequency domain signal $$Z_{TDR}^{(i)}(f,\bar{\theta}_i) = H_i(f) \cdot Z_{in}^{(i)}(f) \cdot Z_{in}^{(i)}(f) - H_i(f) \cdot Z_{SDT}^{(i)}(f,\bar{\theta}_i)$$

We will now start to do the evaluation in the time domain. For this purpose we need to transform our frequency domain signals to time domain. Two ways of doing this is described, with and without Hermitian symmetry. In the later case we will arrive with a complex valued time signal. The described criteria function can handle both case.

Thus, at the i:th iteration step the criteria function yields:

$$J^{(i)}(\bar{\theta}_i) = \sum_{n=n_1}^{n_2} \mathrm{Re}^2\{z_{TDR}^{(i)}(n, \bar{\theta}_i)\} + \mathrm{Im}^2\{z_{TDR}^{(i)}(n, \bar{\theta}_i)\}$$

When performing minimization of $J^{(i)}(\bar{\theta}_i)$, and thus the estimating $\bar{\theta}_i$, a low complexity least square algorithm can be utilized as described previously.

Note that in the above formula, n1 and n2 are also dependent on i, but this dependence has been omitted.

Since $\bar{\theta}_i$ is estimated at each iteration step, the respective characteristic impedance and the propagation constant can be estimated based on the equations defined for the respective model. This is combined with the estimation of the distance or length of the i:th segment, here denoted $d^{(i)}$, i.e. basically the reflection time from measurements plane (i+1) to i, which means that it is possible to calculate the corresponding ABCD-matrix for the currently estimated segment as:

$$\begin{bmatrix} A_i(\bar{\theta}_i, d^{(i)}) & B_i(\bar{\theta}_i, d^{(i)}) \\ C_i(\bar{\theta}_i, d^{(i)}) & D_i(\bar{\theta}_i, d^{(i)}) \end{bmatrix} = \begin{bmatrix} \cosh(\gamma(\bar{\theta}_i)d^{(i)}) & Z_0(\bar{\theta}_i) \cdot \sinh(\gamma(\bar{\theta}_i)d^{(i)}) \\ \frac{1}{Z_0(\bar{\theta}_i)} \cdot \sinh(\gamma(\bar{\theta}_i)d^{(i)}) & \cosh(\gamma(\bar{\theta}_i)d^{(i)}) \end{bmatrix}$$

Before starting next iteration, if the end of transmission line not found, that is i=i+1, we move (virtually) the measurement plane by calculating $Z_{in}^{(i+1)}(f)$ according to the following formula $$Z_{in}^{(i+1)}(f) = \frac{B_i(f, \bar{\theta}_i) - D_i(f, \bar{\theta}_i) \cdot Z_{in}^{(i)}(f)}{C_i(f, \bar{\theta}_i) \cdot Z_{in}^{(i)}(f) - A_i(f, \bar{\theta}_i)}$$

It should be clear that the invention is not limited to the specifically illustrated embodiments but that different models can be used containing different unknown parameters and requiring the set up of different criteria functions. It is also applicable to any type of transmission line or any number of segments. Different kinds of measurement equipments can be also be used. Filters can be used to any required extent and of any kind depending on the requirements on the signal quality to be used in the modelling.

All the described algorithms can be implemented in software. Particularly through the use of the analytical least square (ALS) approach, the algorithm can easily be implemented on a Digital Signal Processor (DSP) or in hardware with Application Specific Integrated Circuits, ASIC, or as a Field Programmable Gate Array, FPGA.

It is an advantage of the invention that, if e.g. SELT is used, measurement features and accuracy can be increased. Contrarily to a static cable database approach, fluctuations in electrical characteristics due to temperature variations etc. can be compensated for automatically. In fact, electrical characteristics can be tracked over time. In addition thereto completely new cables and unknown cables can be identified without requiring updating of any cable database or similar. It is also an advantage of the present invention that the estimation time is reduced as well as memory usage as compared to methods based on use of a large cable database. It is also an advantage of the invention that the system complexity is low, particularly it is reduced as compared to a database based structure. It is advantageous since database handling of many lines requires a lot of processing power and memory whereas the inventive concept can be implemented at DSLAM level (line board level). In addition thereto it does not require any metallic access or by-passing hybrid circuits. Still further it is an advantage that substantially no a priori information is required. The present invention can also be used to create or update a cable database or similar arrangement.

The invention claimed is:

1. A method of determining a plurality of present characteristics of a transmission line having an unknown number of cable segments (S1, . . . , SN) of unknown length and impedance, said method performing a loop topology identification by performing the steps of:

using a processor, modelling and estimating characteristics of a first segment (S1) of the transmission line without a priori knowledge of cable topology of the first segment;

using the processor, iteratively modelling and estimating characteristics of subsequent segments (S2, . . . , SN) based on the estimated characteristics of the first segment consecutively toward a termination end of the transmission line, wherein characteristics of each subsequent segment is modelled and estimated without a priori knowledge of cable topology of each of the subsequent segments;

using the processor, transforming the estimated characteristics of the segments (S1, . . . , SN) to the time domain such that a loop topology identification is provided iteratively; and using the processor, providing information about the plurality of present characteristics for a total transmission line based on the loop topology identification.

2. The method as recited in claim 1, wherein the method includes the steps of:

inputting a probing signal into the transmission line by a measuring equipment connected at a first measurement plane;

using the processor, receiving a reflected echo signal comprising the reflected probing signal;

using the reflected echo signal to calculate the equivalent total input impedance, $Z_{in}^{(1)}(f)$, $(Z_{in}^{(1)}(f))^2$ or $S_{11}^{(1)}(f)$, using the processor;

using the processor, transforming the equivalent total input impedance from the time domain $z_{in}^{(1)}(t)$, $(z_{in}^{(1)}(t))^2$ or $s_{11}^{(1)}(t)$ to a plane domain to enable estimation of cable segment lengths consecutively, for i=1, . . . , N; N being the total, iteratively determined number of cable segments;

using the processor, establishing an estimate of the length of a cable segment $s_i$, the length of which corresponds to the distance $d^i$ from the measurement plane $p_i$ to the subsequent measurement plane $p_{i+1}$;

using the processor, utilizing a selected cable model expressed as a vector $\bar{\theta}_{i,model}$ comprising a number of unknown parameters;

using the processor, setting up a criteria function $J_i$ related to the selected cable model and for the respective cable segment $s_i$;

using the processor, applying the criteria function $J_i$ on the selected cable model;

using the processor, minimizing the criteria function $J_i$ to provide an estimate of a real cable model vector $\bar{\theta}_i$ by reducing or eliminating the influence of the reflected signal produced at measurement planes $p_i$;

using the processor, calculating the characteristic impedance $Z_o(f,\bar{\theta}_i)$ and the propagation constant $\gamma(f,\bar{\theta}_i)$ using the estimated real model vector $\bar{\theta}_i$ of segment $s_i$;

using the processor, calculating the equivalent input impedance, $Z_{in}^{(i+1)}(f)$ or $S_{11}^{(i+1)}(f)$, of the respective subsequent cable segments using the calculated characteristic impedance $Z_o(f,\bar{\theta}_i)$ of the preceding cable segment $s_i$, the propagation constant or velocity $\gamma(f,\bar{\theta}_i)$, an estimated length of the preceding cable segment $s_i$, and the equivalent input impedance, $Z_{in}^{(i)}(f)$ or $S_{11}^{(i)}(f)$, of the respective preceding cable segment $s_i$; and using the processor, transforming the equivalent total input impedance, $Z_{in}^{(i)}(f)$ or $S_{11}^{(i)}(f)$ of the subsequent measurement plane $p_{i+1}$ to the time domain such that a loop topology identification is provided iteratively giving information about the plurality of current transmission line characteristics.

3. The method as recited in claim 2, wherein the measuring equipment is based on Frequency- or Time Domain Reflectometry.

4. The method as recited in claim 2, wherein the calculated equivalent total input impedance comprises the total input impedance $Z_{in}^{(1)}(f)$.

5. The method as recited in claim 2, wherein the calculated equivalent total input impedance comprises a scattering signal $S_{11}^{(1)}(f)$ or that the calculated equivalent total input impedance comprises the total squared input impedance $(Z_{in}^{(1)}(f))^2$.

6. The method as recited in claim 5, wherein the scattering signal comprises a one-port scattering signal $S_{11}^{(1)}(f)$ depending on the total input impedance $Z_{in}^{(1)}(f)$ and a known determined output impedance $Z_{out}(f)$ as:

$$S_{11}^{(1)}(f)=(Z_{in}^{(1)}(f)-Z_{out}(f))/(Z_{in}^{(1)}(f)+Z_{out}(f)).$$

7. The method as recited in claim 2, further comprising, before transforming the respective equivalent input impedance, the step of filtering the calculated equivalent input impedance, using the processor, to improve the measurement of the reflected echo signal.

8. The method as recited in claim 2, wherein the step of transforming the equivalent total input impedance to the time domain comprises transforming the respective equivalent input impedance signal to a real/complex valued signal in the time domain by means of an Inverse Discrete Fourier Transform (IDTF) using a Fast Fourier Transform (IFFT) algorithm, with or without Hermitian symmetry expansion.

9. The method as recited in claim 2, comprising: using the processor, using, as a parameterized frequency dependent cable model, a model comprising electrical and/or physical parameters related to the characteristics of the cable per length unit defined in a table for different cable dimensions providing a vector with M unknown parameters, $\bar{\theta}=[x_1, x_2, \ldots x_M]$.

10. The method as recited in claim 2, comprising: using the processor, using, as a parameterized frequency dependent cable model, an ETSI model with primary parameters comprising the resistance, inductance, the capacitance and the conductance respectively per length unit defined in a table for different cable dimensions providing a vector with unknown parameters, $\bar{\theta}=[r_{oc},a_c,L_o,L_\infty,f_m,b,C_{const}]$.

11. The method as recited in claim 2, comprising: using the processor, using a Hilbert transform to reduce the number of unknown parameters hence providing a vector $\bar{\theta}$ with a reduced number of unknown parameters, e.g. $\bar{\theta}=[r_{oc},a_c,L_\infty,C_{const}]$.

12. The method as recited in claim 10, wherein the minimizing step comprises performing an optimization using an optimization algorithm to estimate at least some of the unknown primary parameters and allowing calculation or estimation of the unknown secondary parameters comprising the respective characteristic impedance and the propagation constant or velocity of the respective cable segment.

13. The method as recited in claim 11, wherein the optimization step comprises, based on a criteria function $J_i$ defined in the time or the frequency domain, for the respective segment $s_i$:
 transforming the used frequency domain criteria function to time domain;
 using time indices indicating the time interval corresponding to the respective cable segment $s_i$, i=1, . . . , N; and
 minimizing the respective criteria function $J_i$ in each iterative step for each consecutive cable segment $s_i$.

14. The method as recited in claim 2, wherein, for minimizing the criteria function, the method comprises using the general or an analytical least square approach to provide the unknown parameters.

15. The method as recited in claim 2, comprising the steps of, in each iteration step, or for each cable segment $s_i$:
 using the processor, estimating the unknown parameters defined as the unknown vector $\bar{\theta}_i$, i=1, . . . , N;
 using the processor, storing the respective unknown parameter vectors $\bar{\theta}_i$; and
 using the processor, using the $\bar{\theta}_i$-vectors to build a cable model database.

16. The method as recited in claim 14, comprising: using the processor, calculating or virtually measuring the input impedance $Z_{in}^{(i)}$ or the scattering signal $S_{11}^{(i)}$ seen from the beginning of segment $s_i$ based on the previous unknown parameters of the respective previous unknown parameter vectors $\bar{\theta}_{i-1}$.

17. The method as recited in claim 2, comprising: using the processor, compensating for a mismatch between the measured total input equivalent impedance and the output impedance of the measurement equipment.

18. The method as recited in claim 17, wherein the compensating step comprises subtracting the ratio of the difference between the calculated equivalent total input impedance and the equipment output impedance and the sum of the calculated equivalent total input impedance and the equivalent output impedance from the calculated equivalent total input equivalent impedance.

19. The method as recited in claim 2, wherein the measuring equipment implements Single Ended Loop Testing (SELT).

20. The method as recited in claim 2, wherein the plurality of characteristics of the cable include at least one of the number of cable segments, the length of each cable segment, electrical characteristics for each cable segment, attenuation, cable structure, and far-end termination.

21. A system for determining a plurality of current present characteristics of a transmission line having an unknown number of cable segments of unknown length and impedance, wherein the system performs a loop topology identification, said system comprising:
 means for modelling and estimating characteristics of a first segment (S1) of the transmission line without a priori knowledge of cable topology of the first segment;
 means for iteratively modelling and estimating characteristics of subsequent segments (S2, . . . , SN) based on the estimated characteristics of the first segment consecutively toward a termination end of the transmission line, wherein characteristics of each subsequent segment is modelled and estimated without a priori knowledge of cable topology of each of the subsequent segments;
 means for transforming the estimated characteristics of the segments (S1, . . . , SN) to the time domain such that a loop topology identification is provided iteratively; and
 means for providing information about the plurality of present characteristics for a total transmission line based on the loop topology identification.

22. The system as recited in claim 21, comprising:
 a measuring equipment connected at a first measurement plane $p_i$ and comprising:
  means for transmitting a probing signal into the cable; and
  means for handling a reflected echo signal from the transmitted probing signal, said reflected echo signal comprising one or more echoes;
 calculating means for calculating the equivalent total input impedance, $Z_{in}^{(1)}(f)$, $(Z_{in}^{(1)}(f))^2$ or $S_{11}^{(1)}(f)$;
 means for transforming the calculated equivalent total input impedance, $Z_{in}^{(1)}(f)$, $(Z_{in}^{(1)}(f))^2$ or $S_{11}^{(1)}(f)$, to the time domain; and
 calculating means for establishing, for i=, . . . , N, an estimate of the length of the respective cable segment $s_i$ corresponding to the distance $d_i$ from the measurement plane $p_i$ to a subsequent measurement plane $p_{i+1}$, said calculating means comprising an algorithm executing means for selecting and using a model for estimating or calculating the characteristic impedance and the propagation constant or velocity of a respective cable segment based on a number of unknown parameters represented as a respective vector $\bar{\theta}_i$ for the respective segment $s_i$ to set up a criteria function $J_i$ associated with the model, and for each respective segment $s_i$ for applying the criteria function $J_i$ on the model, and for iteratively calculating the respective equivalent input impedance, e.g. $Z_{in}^{(i+1)}(f)$ or $S_{11}^{(i+1)}(f)$, of the respective subsequent cable segments using the calculated characteristic impedance $Z_0(f,\bar{\theta}^i)$ of the preceding cable segment $s_i$, the propagation constant $\gamma(f,\bar{\theta}_i)$ or propagation velocity with an estimated length of the respective preceding cable segment $s_i$, and the equivalent input impedance, $Z_{in}^{(i)}(f)$, $(Z_{in}^{(i)}(f))^2$ or $S_{11}^{(i)}(f)$, of the preceding cable segment and to transform the total input impedance of the subsequent measurement plane $p_{i+1}$ such that a loop topology identification is provided iteratively.

23. The system as recited in claim 22, wherein the measuring equipment implements Time Domain Reflectometry.

24. The system as recited in claim 22, wherein the calculated equivalent total input impedance comprises the total input impedance $Z_{in}^{(1)}(f)$.

25. The system as recited in claim 22, wherein the calculated equivalent total input impedance comprises a scattering signal $S_{11}^{(1)}(f)$ or the total squared input impedance $(Z_{in}^{(i)}(f))^2$.

26. The system as recited in claim 22, comprising filtering means for filtering the calculated equivalent total input impedance to improve the quality of the echo signal.

27. The system as recited in claim 22, wherein the means for transforming the calculated equivalent total input impedance comprises a Fast Fourier Transform algorithm for application of a Inverse Discrete Fourier Transform to the calculated equivalent total input impedance.

28. The system as recited in claim 22, wherein the cable model comprises a number of unknown parameters, represented as a vector $\bar{\theta}_i$ for each respective segment $s_i$ comprising the secondary parameters constituting the characteristic impedance $Z_0(f,\bar{\theta}_i)$, i=1, ..., N and the propagation constant $\gamma(f,\bar{\theta}_i)$.

29. The system as recited in claim 28, wherein each respective criteria function $J_i$ iteratively is minimized for the respective $s_i$ to reduce or eliminate the influence of the reflected signal produced at the respective measurement plane $p_i$.

30. The system as recited in claim 28, wherein in the last iteration, the estimated parameters $\bar{\theta}_N$ and calculated equivalent impedance or scattering signal $Z_{in}^{(N)}(f)$ or $S_{in}^{(N)}(f)$ provides means for calculating the input impedance corresponding to the impedance of the termination end point of the transmission line.

31. The system as recited in claim 21, further comprising means for utilizing a general or an analytical least square (ALS) algorithm in the successive modelling and estimation.

32. The system as recited in claim 22, wherein the system is implemented as software connected to the measuring equipment and optionally a transceiver.

33. The system as recited in claim 21, wherein the system is implemented as hardware utilizing an Application Specific Integrated Circuit (ASIC) or Field Programmable Gate Array (FPGA).

34. The system as recited in claim 21, further comprising means for using the characteristics to build a cable database.

* * * * *

UNITED STATES PATENT AND TRADEMARK OFFICE
CERTIFICATE OF CORRECTION

PATENT NO. : 8,065,100 B2  
APPLICATION NO. : 12/162665  
DATED : November 22, 2011  
INVENTOR(S) : Lindqvist et al.

Page 1 of 2

It is certified that error appears in the above-identified patent and that said Letters Patent is hereby corrected as shown below:

On the Face Page, in the Figure, for Tag "105", in Line 1, delete " $q$ " and insert -- $d_i$ --, therefor.

On the Face Page, in the Figure, for Tag "109", in Line 2, delete "MAXTRIX" and insert -- MATRIX --, therefor.

In Fig. 1, Sheet 1 of 7, for Tag "105", in Line 1, delete " $q$ " and insert -- $d_i$ --, therefor.

In Fig. 1, Sheet 1 of 7, for Tag "109", in Line 2, delete "MAXTRIX" and insert -- MATRIX --, therefor.

In Column 3, Line 32, delete "$d^i$" and insert -- $d_i$ --, therefor.

In Column 3, Line 42, delete " $Z_o(f,\bar{\theta}_i)$ " and insert -- $Z_0(f,\bar{\theta}_i)$ --, therefor.

In Column 3, Lines 46-47, delete " $Z_o(f,\bar{\theta}_i),$ " and insert -- $Z_0(f,\bar{\theta}_i),$ --, therefor.

In Column 4, Line 8, delete "Fast Fourier" and insert -- Inverse Fast Fourier --, therefor.

In Column 4, Line 29, delete "$C_{const}$]" and insert -- $C_{const}$], --, therefor.

In Column 4, Line 51, delete "i-1,..., N;" and insert -- i=1,..., N; --, therefor.

In Column 5, Line 21, delete "i=,..., N," and insert -- i=1,..., N, --, therefor.

In Column 10, Line 51, delete "$Z_T(f),$" and insert -- $Z_T(f).$ --, therefor.

Signed and Sealed this  
Twenty-first Day of February, 2012

David J. Kappos  
*Director of the United States Patent and Trademark Office*

CERTIFICATE OF CORRECTION (continued)
U.S. Pat. No. 8,065,100 B2

In Column 14, Line 67, delete "$Z_{STD}^{(i)}(f)$" and insert -- $Z_{SDT}^{(i)}(f)$ --, therefor.

In Column 16, Line 67, delete "$Z_{SDT}(t, a_f, \overline{\alpha})$" and insert -- $z_{SDT}(t, a_f, \overline{\alpha})$ --, therefor.

In Column 21, Line 66, in Claim 2, delete "$d^i$" and insert -- $d_i$ --, therefor.

In Column 22, Line 14, in Claim 2, delete "$Z_o(f, \overline{\theta}_i)$" and insert -- $Z_0(f, \overline{\theta}_i)$ --, therefor.

In Column 22, Line 19, in Claim 2, delete "$Z_o(f, \overline{\theta}_i)$" and insert -- $Z_0(f, \overline{\theta}_i)$ --, therefor.

In Column 22, Line 57, in Claim 8, delete "Fast Fourier" and insert -- Inverse Fast Fourier --, therefor.

In Column 23, Line 66, in Claim 21, delete "current present" and insert -- present --, therefor.

In Column 24, Line 35, in Claim 22, delete "i=,..., N," and insert -- i=1,..., N, --, therefor.